(12) United States Patent
Hekal

(10) Patent No.: US 6,316,520 B1
(45) Date of Patent: Nov. 13, 2001

(54) MONOLITHIC POLYMER COMPOSITION HAVING A RELEASING MATERIAL

(75) Inventor: Ihab M. Hekal, Stamford, CT (US)

(73) Assignee: Capitol Specialty Plastics, Inc., Auburn, AL (US)

(*) Notice: Subject to any disclaimer, the term of this patent is extended or adjusted under 35 U.S.C. 154(b) by 0 days.

(21) Appl. No.: 09/157,032

(22) Filed: Sep. 18, 1998

Related U.S. Application Data

(63) Continuation-in-part of application No. 09/087,830, filed on May 29, 1998, now Pat. No. 6,124,006, which is a continuation-in-part of application No. 08/812,315, filed on Mar. 5, 1997, now Pat. No. 6,130,263, which is a continuation-in-part of application No. 08/611,298, filed on Mar. 5, 1996, now Pat. No. 5,911,937, which is a continuation-in-part of application No. 08/424,996, filed on Apr. 19, 1995, now abandoned.

(51) Int. Cl.$^7$ ............................... A61L 9/01; A01N 25/00
(52) U.S. Cl. ..................... 523/102; 523/122; 523/132; 521/905; 524/387; 524/503
(58) Field of Search ............... 264/349; 521/905; 524/503, 387; 523/102, 122, 132

(56) References Cited

U.S. PATENT DOCUMENTS

| | | |
|---|---|---|
| 1,481,971 | 1/1924 | Whiting . |
| 1,532,831 | 4/1925 | Mastin . |
| 2,202,742 | 5/1940 | McCorkhill . |
| 2,511,666 | 6/1950 | Barr . |
| 2,638,179 | 5/1953 | Yard . |
| 2,991,500 | 7/1961 | Hagen . |
| 3,013,308 | 12/1961 | Armour . |
| 3,101,242 | 8/1963 | Jackson, Jr. . |
| 3,156,402 | 11/1964 | Dupuis . |
| 3,245,946 | 4/1966 | O'Connor et al. . |
| 3,256,411 | 6/1966 | Grasty . |
| 3,322,355 | 5/1967 | Bryant . |
| 3,326,810 | 6/1967 | Dolan et al. . |

(List continued on next page.)

FOREIGN PATENT DOCUMENTS

| | | |
|---|---|---|
| 4013799 | 10/1999 | (DE) . |
| 0172774 A1 | 2/1986 | (EP) . |
| 0225593 A3 | 6/1987 | (EP) . |
| 931087639 | 9/1993 | (EP) . |
| EO 96/29603 | 9/1996 | (WO) . |
| PCT/US97/03610 | 5/1997 | (WO) . |
| PCT/WO97/27483 | 7/1997 | (WO) . |
| PCT/WO97/32663 | 9/1997 | (WO) . |
| PCT/WO98/39231 | 9/1998 | (WO) . |
| WO 96/333108 | 10/1999 | (WO) . |

*Primary Examiner*—Jan H. Silbaugh
*Assistant Examiner*—Suzanne E. McDowell
(74) *Attorney, Agent, or Firm*—Dreier & Baritz LLP.

(57) ABSTRACT

The present invention includes processes and resulting structures for producing a modified polymer having interconnecting channels. The interconnecting channels act as controlled transmission passages through the polymer. A hydrophilic agent is blended into the polymer so that it is distributed within the polymer. In one embodiment, a releasing material is blended into the polymer so that the releasing material is distributed within the product. The product is solidified so that the hydrophilic agent forms passages in the product through which a desired composition is communicable to the releasing material that is entrained within the product. The solidified product may be used to form a desired shaped article such as plug type inserts and liners for closed containers, or it may be formed into a film, sheet, bead or pellet.

36 Claims, 28 Drawing Sheets

U.S. PATENT DOCUMENTS

| | | | |
|---|---|---|---|
| 3,375,208 | * 3/1968 | Duddy | 260/2.1 |
| 3,537,676 | 11/1970 | Miller . | |
| 3,567,085 | 3/1971 | Flores . | |
| 3,687,062 | 8/1972 | Frank . | |
| 3,704,806 | 12/1972 | Plachenov et al. . | |
| 3,730,372 | 5/1973 | Komendowski . | |
| 3,750,966 | 8/1973 | Anderson . | |
| 3,804,282 | 4/1974 | Komendowski . | |
| 3,833,406 | 9/1974 | White . | |
| 3,881,026 | * 4/1975 | Shepherd et al. | 426/223 |
| 3,926,379 | 12/1975 | Dryden et al. . | |
| 3,929,295 | 12/1975 | Montalbano . | |
| 3,931,067 | * 1/1976 | Goldberg et al. | 260/2.5 M |
| 4,013,566 | 3/1977 | Taylor . | |
| 4,021,388 | 5/1977 | Griffin . | |
| 4,029,830 | 6/1977 | Yamamoto . | |
| 4,036,360 | 7/1977 | Deffeyes . | |
| 4,081,397 | 3/1978 | Booe . | |
| 4,165,743 | 8/1979 | Denning . | |
| 4,201,209 | 5/1980 | LeVeen et al. . | |
| 4,240,937 | 12/1980 | Allen . | |
| 4,243,767 | 1/1981 | Kaufman et al. . | |
| 4,284,548 | 8/1981 | Kaufman et al. . | |
| 4,284,671 | * 8/1981 | Cancio et al. | 428/35 |
| 4,387,803 | 6/1983 | Mercil . | |
| 4,394,144 | 7/1983 | Aoki . | |
| 4,405,360 | * 9/1983 | Cardarelli | 71/117 |
| 4,407,897 | 10/1983 | Farrell et al. . | |
| 4,425,410 | 1/1984 | Farrell et al. . | |
| 4,447,565 | 5/1984 | Lula et al. . | |
| 4,464,443 | 8/1984 | Farrell et al. . | |
| 4,485,204 | 11/1984 | Nabors . | |
| 4,533,576 | 8/1985 | Tanahashi et al. . | |
| 4,547,536 | 10/1985 | Nabors . | |
| 4,554,297 | 11/1985 | Dabi . | |
| 4,573,258 | 3/1986 | Io et al. . | |
| 4,665,050 | 5/1987 | Degan et al. . | |
| 4,686,093 | 8/1987 | Flanigen et al. . | |
| 4,725,393 | 2/1988 | Nasu . | |
| 4,770,944 | 9/1988 | Farrell et al. . | |
| 4,772,300 | 9/1988 | Cullen et al. . | |
| 4,783,056 | 11/1988 | Abrams . | |
| 4,783,206 | 11/1988 | Cullen et al. . | |
| 4,792,484 | 12/1988 | Moritani . | |
| 4,834,234 | 5/1989 | Sacherer et al. . | |
| 4,969,998 | 11/1990 | Henn . | |
| 4,994,312 | 2/1991 | Maier et al. . | |
| 5,078,909 | 1/1992 | Shigeta et al. . | |
| 5,114,003 | 5/1992 | Jackisch et al. . | |
| 5,118,655 | 6/1992 | Pedersen . | |
| 5,128,182 | 7/1992 | Bunker et al. . | |
| 5,130,018 | 7/1992 | Tolman et al. . | |
| 5,143,763 | 9/1992 | Yamada et al. . | |
| 5,154,960 | 10/1992 | Mucci et al. . | |
| 5,228,532 | 7/1993 | Juhl et al. . | |
| 5,242,652 | 9/1993 | Savigny . | |
| 5,267,646 | 12/1993 | Inoue et al. . | |
| 5,286,407 | 2/1994 | Inoue et al. . | |
| 5,304,419 | 4/1994 | Shores . | |
| 5,320,778 | 6/1994 | Miksic et al. . | |
| 5,344,589 | 9/1994 | Miksic et al. . | |
| 5,393,457 | 2/1995 | Miksic et al. . | |
| 5,399,609 | 3/1995 | Moss . | |
| 5,415,907 | 5/1995 | Inoue et al. . | |
| 5,432,214 | 7/1995 | Lancesseur . | |
| 5,494,155 | 2/1996 | Evans et al. . | |
| 5,496,397 | 3/1996 | Fischer et al. . | |
| 5,518,761 | 5/1996 | Hatsuda et al. . | |
| 5,551,141 | 9/1996 | De Arth et al. . | |
| 5,580,369 | 12/1996 | Belding et al. . | |
| 5,596,051 | 1/1997 | Jahns et al. . | |
| 5,633,351 | 5/1997 | Reed . | |
| 5,656,503 | 8/1997 | May . | |
| 5,773,105 | 6/1998 | Klett . | |
| 5,814,136 | 9/1998 | Wood . | |
| 5,911,937 | 6/1999 | Hekal . | |
| 6,080,350 | 6/2000 | Hekal . | |

\* cited by examiner

MONOLITHIC POLYMER COMPOSITION HAVING A RELEASING MATERIAL

RELATED APPLICATION

This application is a continuation-in-part of U.S. Ser. No. 09/087,830, filed May 29, 1998, now U.S. Pat. No. 6,124, 006, which in turn is a continuation-in-part of U.S. Ser. No. 08/812,315, filed Mar. 5, 1997, now U.S. Pat. No. 6,130,263, which in turn is a continuation-in-part of U.S. Ser. No. 08/611,298, filed on Mar. 5, 1996, now U.S. Pat. No. 5,911,937, which in turn is a continuation-in-part of U.S. Ser. No. 08/424,996, filed Apr. 19, 1995, now abandoned.

FIELD OF THE INVENTION

This invention generally relates to monolithic compositions comprising a water-insoluble polymer, a hydrophilic agent and a releasing material. In one embodiment, the present invention relates to modified polymers blended with one or more releasing materials to form a releasing material entrained polymer. The invention further relates to an entrained polymer that includes means by which the releasing material located within interior portions of the polymer structure are exposed to conditions that are exterior to the polymer body. In one embodiment, the entrained polymer of the present invention is useful in the manufacture of containers and packaging for items requiring controlled environments.

BACKGROUND OF THE INVENTION

There are many items that are preferably stored, shipped and/or utilized in an environment that must be controlled and/or regulated. For example, in the moisture control area, containers and/or packages having the ability to absorb excess moisture trapped therein have been recognized as desirable. One application in which moisture absorbing containers are desired is for the shipment and storage of medications whose efficacy is compromised by moisture. The initial placement of medicines into a sealed moisture free container is usually controllable. Furthermore, the container for the medicine is selected so that is has a low permeability to moisture. Therefore, the medication will normally be protected from moisture until it reaches the end user. Once the medicine is received by the customer, however, the container must be repeatedly opened and closed to access the medication. Each time the container is opened and unsealed, moisture bearing air will most likely be introduced into the container and sealed therein upon closure. Unless this moisture is otherwise removed from the atmosphere or head space of the container, it may be detrimentally absorbed by the medication. For this reason, it is a well known practice to include a desiccating unit together with the medication in the container.

Other items, electronic components may require reduced moisture conditions for optimal performance. These components may be sealed in containers, but excess moisture that is initially trapped therein must be removed. Furthermore, the housings may not be completely moisture tight, and moisture may be allowed to seep into the container. This moisture must also be retained away from the working components. For these reasons, it is important to include a desiccating agent within the housing for absorbing and retaining excess moisture. Because of the delicacy of many of the components that are to be protected from the moisture, it is important that the desiccant used not be of a "dusting" nature that may contaminate and compromise the performance of the components. Therefore, it has been recognized as advantageous to expose a desiccating agent to the interior space of such containers, while at the same time shielding the working components from actual contact with the desiccating material, including desiccant dust that may be produced therefrom.

In other instances, moisture may be released from items that have been placed in containers or sealed in packaging wrap for shipping and/or storage. Prime examples of such items are food stuffs-that release moisture during shipping and storage. In the instance of containers that are sealed and substantially impermeable to moisture, the released moisture will remain within the container. If not removed, this released moisture may have ill effects on the very item that released the moisture. It has been found that a substantial amount of moisture is released from certain food products within the first forty-eight (48) hours after manufacture and packaging. This released moisture will remain until removed. If the moisture is not removed shortly after its release, it may cause the food to degrade into a condition that is not saleable. In these cases, desiccants may be included together with the contained items to continually absorb the released moisture until the product is unpacked. In this way, a relatively dry environment is maintained about the stored item.

SUMMARY OF THE INVENTION

The present invention discloses both a structure and a method by which interconnecting channels are established throughout the composition. These interconnecting channels communicate the entrained releasing material to the appropriate areas of the exterior of the composition in a manner that permits the desired property to migrate from outside the plastic structure to interior locations where the releasing material is positioned. Furthermore, these interconnecting channels through which the desired property is permitted to travel are occupied by hydrophilic agents (e.g., channeling agents) that control the transmission rate into the composition. The hydrophilic agents are used to act as bridges from the surface of the composition inwardly to the releasing material positioned within the composition.

Figure 1:
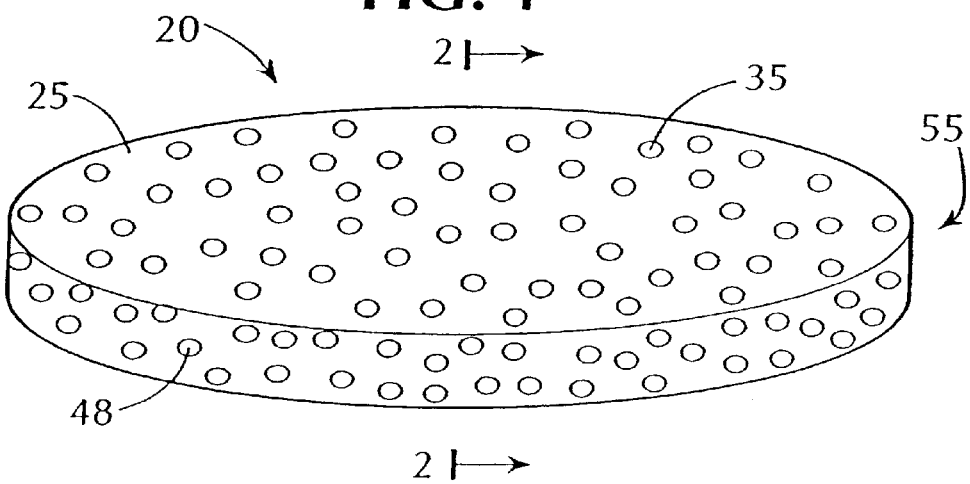
FIG. 1 is a perspective view of a plug, insert, or tablet constructed from the composition of the present invention showing, in an exaggerated scale, the openings of the interconnecting channels at the exterior surface of the plug.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

It has been discovered that certain compounds, which are referred to herein as hydrophilic agents (e.g., channeling agents), may be combined with a water-insoluble polymer that is used in the formation of shaped articles. In practice, in one embodiment the water-insoluble polymer base into which the hydrophilic agent is blended includes, as examples, any polyethylene and polypropylene.

In one embodiment, a releasing material and hydrophilic agent are added to the water-insoluble polymer when the polymer is in a molten state or before the polymer is in the molten state, so that the material and hydrophilic agent may be blended and thoroughly mixed throughout the polymer to insure that the blend is uniformly mixed before reaching the melt phase. For example, such a technique is useful when the releasing material, hydrophilic agent and polymer are all powders.

In another embodiment, the hydrophilic agent and polymer are mixed prior to adding the releasing material. The hydrophilic agent is added either before the polymer is in the molten state or after the polymer is in the molten state. For example, the releasing material may be added to the polymer during the thermal process of forming sheets.

After thorough blending and processing, following by cooling, the hydrophilic agent forms interconnecting channels that act as transmission communicating passages throughout the polymer. In addition, the composition of the present invention is monolithic and the water-insoluble polymer, hydrophilic agent and releasing material form a three phase system.

For purposes of the present invention, the term "phase" means a portion of a physical system that is uniform throughout, has defined boundaries and, in principle, be separated physically from other phases. The term "interconnecting channels" means channels that penetrate through the water-insoluble polymer and that may be interconnected to each other. The term "water-insoluble polymer" means a polymer having a solubility in water below about 0.1% at 25° C. and atmospheric pressure. The term "hydrophilic agent" is defined as a material that is not substantially cross-linked and that has a solubility in water of at least about 1% at 25° C. and atmospheric pressure. Suitable hydrophilic agents include "channeling" agents. The term "monolithic composition" means a composition that does not consist of two or more discrete macroscopic layers. Accordingly, a "monolithic composition" does not include a multi-layer composite. Moreover, for purposes of the present invention, the term "melting point" is defined as the first order transition point of the material determined by DSC. The term "not mutually soluble" means immiscible with each other.

In one embodiment, suitable hydrophilic agents of the present invention include polyglycols such as poly(ethylene glycol) and poly(propylene glycol) and mixtures thereof. Other suitable materials include EVOH, glycerin, pentaerithritol, PVOH, polyvinylpyrollidine, vinylpyrollidone or poly(N-methyl pyrollidone) and saccharide based compounds such as glucose, fructose, and their alcohols, mannitol, dextrin and hydrolyzed starch being suitable for the purposes of the present invention since they are hydrophilic compounds.

In another embodiment, suitable hydrophilie agents of the present invention may also include any hydrophilic material wherein, during processing, the hydrophilic agent is heated above its melt point upon melt mixing, and subsequently upon cooling separates from the polymer to form the interconnecting channeled structure of the present invention and a three phase system of a water-insoluble polymer, hydrophilic agent and a releasing material.

The present invention may be employed with a variety of releasing material. Such material may comprise any suitable form which will release dispersant to surrounding atmosphere, including solid, gel, liquid, and in some cases a gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents, etc.

The biocides of the present invention may include, but are not limited to, pesticides, herbicides, nematacides, fungicides, rodenticides and/or mixtures thereof. In addition to the biocides, the covering of the present invention can also release nutrients, plant growth regulators, pheromones, defoliants and/or mixture thereof.

The incorporation of a quaternary ammonium compound, not only functions as a surfactant but also imparts to the surface of the manufactured product aseptic properties or establishes conditions for reducing the number of microbial organisms, some of which can be pathogenic. Numerous other antimicrobial agents, such as benzalkonium chloride and related types of compounds as hexachlorophene, may also be used.

Other releasing materials include fragrances, including natural, essential oils and synthetic perfumes, and blends thereof. Typical perfumery materials which may form part of, or possible the whole of, the active ingredient include: natural essential oils such as lemon oil, mandarin oil, clove leaf oil, petitgrain oil, cedar wood oil, patchouli oil, lavandin oil, neroli oil, ylang oil, rose absolute or jasmin absolute; natural resins such as labdanum resin or olibanum resin; single perfumery chemicals which may be isolated from natural sources of manufactured synthetically, as for example alcohols such as geraniol, nerol, citronellol, linalol, tetrahydrogeraniol, betaphenylethyl alcohol, methyl phenyl carbinol, dimethyl benzyl carbinol, menthol or cedrol; acetates and other esters derived form such alcohols-aldehydes such as citral, citronellal, hydroxycitronellal, lauric aldehyde, undecylenic aldehyde, cinnamaldehyde, amyl cinnamic aldehyde, vanillin or heliotropin; acetals derived from such aldehydes; ketones such as methyl hexyl ketone, the ionones and methylionones; phenolic compounds such as eugenol and isoeugenol; synthetic musks such as musk xylene, musk ketone and ethylene brassylate.

In one embodiment relating to releasing material having a relatively fine particle size, many small interconnecting channels throughout the polymer should be produced, as opposed to a few large interconnecting channels that will expose less surface area within the polymer. In one embodiment, dimer agents such as polypropylene maleic anhydride, or any plasticizer, may be optionally added to the mixture reducing viscosities and increasing the mixing compatibility of the polymer and hydrophilic agent.

In yet another embodiment, releasing materials are selected having a polarity that causes an affinity between the releasing agent and the hydrophilic agent. For this reason, during the separating process when the interconnecting channels are formed throughout the polymer, it is believed that the releasing material will migrate toward the hydrophilic agent domains to which it is attracted. In this manner, it is theorized that the hydrophilic agent is permitted to act as a bridge between moisture located exteriorly to the polymer structure and the releasing material that is located within the polymer. This is particularly true with respect to a releasing material that is bound within the hydrophilic agent filled passages. In a further embodiment, polar plasticizers such as glycerin may be further added to the mixture which enhance the dispersion or mixing of the releasing material into the hydrophilic agent.

It is believed that the higher the releasing material concentration in the mixture, the greater the absorption capacity will be of the final composition. However, the higher releasing material concentration should cause the body to be more brittle and the mixture to be more difficult to either thermally form, extrude or injection mold. In one embodiment, the releasing material loading level can range from 10% to 20%, 20% to 40% and 40% to 60% by weight with respect to the polymer.

In one embodiment, the water-insoluble polymer of the present invention may be any thermoplastic material. Examples of suitable thermoplastic materials include polyolefins such as polypropylene and polyethylene, polyisophrene, polybutadiene, polybutene, polysiloyane, polycarbonates, polyamides, ethylene-vinyl acetate copolymers, ethylene-methacrylate copolymer, poly(vinyl chloride), polystyrene, polyesters, polyanhydrides, polyacrylonitrile, polysulfones, polyacrylic ester, acrylic, polyurethane and polyacetal, copolymers or mixtures thereof.

In yet another embodiment, the components are first dry mixed in a mixer such as a Henschel, and then fed to a compounder. A Leistritz twin screw extruder, for example, or a Werner Pfleider mixer can be used to achieve a good melt mix at about 140° C. to about 170° F. The melt can then be either extruded to form, for example, a film or converted into pellets using dry air cooling on a vibrating conveyer. The formed pellets, containing channels, can, for example, then be either injection molded into beads, sieves, or co-injected with polypropylene as the inside layer of a container.

In yet a further another embodiment, because the composition of the present invention may typically be more brittle than the polymer without the releasing material, the package may be molded so that an interior portion of the package is the composition of the present invention while the exterior portions are formed from pure polymer or the composition of the present invention with a lower releasing material loading level. For example, a package having an interior portion composed of the composition of the present invention and an exterior portion composed of pure polymer typically will not only be more durable and less brittle, but it will also act as a barrier that resists the transmission of moisture from the exterior into the interior of the package. In this manner, the capacity of the releasing material is potentiated by exposing it exclusively to the interior of the package from which it is desired that the material will be released.

The composition of the present invention has numerous applications. One application is the construction of rigid containers that are suitable for containing relatively small volumes of product such as food stuffs and medicines. In many cases, these types of products must be shipped and stored in controlled environments (e.g. reduced moisture and/or oxygen). In another embodiment, the composition of the present invention may be formed into an insert for inclusion within the interior of the container. An example of one form of an insert is a plug of any suitable shape. While the plug would serve its purpose by being merely deposited within the container, it may also be fixed to an interior location so that it does move about within the interior space. In a further embodiment, it is anticipated that a plug formed into a disc may be shaped and sized to be pressed fit into the bottom of a polymer formed container.

In another embodiment, a liner may be formed from the composition of the present invention that has an exterior surface substantially conforming to an interior surface of the container body. Like the disc, the liner may be sized so that it may be press-fit into position within the polymer body where it is held sufficiently snugly to prevent its unintended disengagement therefrom. Alternatively, in a further embodiment, either the plug or liner may be initially constructed and allowed to harden, and then the container body subsequently constructed thereabout so that the greater shrinkage characteristics of the polymer body not containing the releasing material tightly shrink-fits the container body about the plug or liner so that neither becomes easily disengaged from the other. In still a further embodiment, the insert taking the form of either a plug or a liner may be substantially simultaneously comolded with the polymer container body so that each is integrally joined with the other. In the event of a co-molding process, the viscosities of the desiccant laden insert and the polymer container body should typically be approximately equal to facilitate the proper and desired location of the two phases of liquid or molten material that are molded together.

In yet another embodiment, composition of the present invention may be used to form sheeting that is joined with another sheet. In at least one embodiment, the sheets are effectively laminated one to the other so that an exterior layer may be established adjacent to the composition of the present invention which is substantially air and moisture impermeable. The laminate sheet may then be used to wrap an item which is to be stored in a controlled environment. One means by which the joinder process may be accomplished is through a thermal extrusion procedure.

In each of the embodiments of the present invention described herein, advantages and enhancements over the prior art methods and structures stem from the discovery of the ability to create interconnecting channels throughout the composition of the present invention so that a rigid body may be constructed from the composition of the present invention while also exposing the releasing material to the environment. Furthermore, the discovery of employing a hydrophilic agent that also acts as a transmission rate bridge between the exterior of the polymer body and the interiorly located releasing material greatly enhances the structures' ability to quickly remove the desired property located exteriorly to the entrained structure, while at the same time taking advantage of a greater portion of the material's capacities.

One embodiment of the present invention includes a process for producing the composition of the present invention. In one embodiment, the process comprises blending a water-insoluble polymer and a hydrophilic agent. Either prior to blending the hydrophilic agent or after blending the hydrophilic agent, the releasing material is blended into the polymer so that the additive is uniformly distributed within the polymer and the hydrophilic agent is distributed within the polymer. Subsequently, after the composition is solidified, the result is that the hydrophilic agent forms interconnecting channels in the composition through which the desired property is transmitted through the polymer to the releasing material within the composition. In another embodiment, the hydrophilic agent and releasing material are all thoroughly mixed in dry powder form, and then the polymer blend is melted and formed into a desired shape by molding. Interconnecting channels are formed in the composition through which the desired property is transmitted through the polymer to the releasing material within the composition.

In an alternative embodiment of the present invention, the monolithic composition comprising a water-insoluble polymer, a hydrophilic agent and a releasing material may be made by first producing a two phase system comprising the water-insoluble polymer and the hydrophilic agent, then immersing the two phase system in a solution containing the releasing material. As a result, the releasing material is taken up by the composition and results in a monolithic composition consisting of at least three phases comprising the water-soluble polymer, the hydrophilic agent and the releasing material. It is to be understood that, for purposes of the present invention, immersing includes soaking, coating or other methods that result in an uptake of the releasing material by the composition.

One specific example consists of (1) mixing the water-insoluble polymer and the hydrophilic agent to produce a uniform blend; (2) heating the blend of step (1) to a temperature above the melting point of the hydrophilic agent; (3) cooling the blend of step (2) to form the desired shaped article; (4) immersing the shaped article of step (3) in a solution containing the releasing material; (5) drying under suitable conditions that would not detrimentally affect the materials; and (6) forming a shaped article comprising a monolithic composition comprising the water-insoluble polymer; the hydrophilic agent and the releasing material.

This alternative embodiment may be well-suited for materials that are heat-sensitive and thus, that may not be capable of withstanding the temperatures required to melt the hydrophilic agent during processing. An example of such high temperatures are the temperatures incurred during the extrusion step. Consequently, the releasing material may be added downstream from the extrusion and thus, are not subject to higher temperatures, which may detrimentally effect the material. A further example of this alternative embodiment relates to producing the solution for the releasing material. In one embodiment, an aqueous solution of the releasing material is produced.

In one embodiment, the composition of the present invention is used to form a plug for inclusion within a package constructed of a barrier substance. In another, the composition of the present invention is used to form a liner for inclusion within a container constructed from a barrier substance. In still another embodiment, the composition of the present invention is used to form an absorption sheet. The absorption sheet may optionally be combined with a barrier sheet constructed of a barrier substance for use as a packaging wrap. In another embodiment, the composition of the present invention is used to form an absorbing insert for a container.

Referring to FIG. 1 of the accompanying drawings of an embodiment of the present invention, an insert constructed from the composition of the present invention 20 is illustrated. For purposes of this disclosure of the present invention, the words "entrain" and "contain" have been used interchangeably when referring to the inclusion of a desiccating agent 30 in a polymer 25 matrix. The insert is in the form of a plug 55 that may be deposited into a container body 60 (FIG. 5) thereby establishing a container 61 (FIG.

Figure 2:
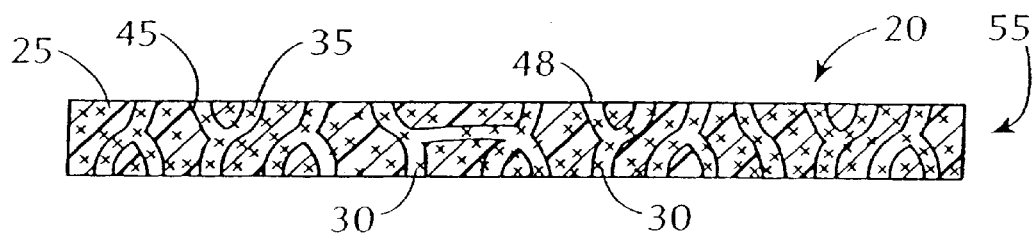
FIG. 2 is an exaggerated, cross-sectional view of a solidified plug formed from a water-insoluble polymer having a hydrophilic agent and a releasing material blended therewith.

5). Referring to FIG. 2, a cross-sectional view is shown of the plug 55 that has been constructed from a polymer mixture comprising the water-insoluble polymer 25 that has been uniformly blended with the releasing material 30 and the hydrophilic agent 35. In the illustration of FIG. 2, the composition of the present invention has been solidified so that interconnecting channels 45 have formed throughout the composition to establish passages throughout the solidified plug 55. As may be appreciated in both FIGS. 1 and 2, the passages terminate in channel openings 48 at an exterior surface of the plug 55.

Figure 3:
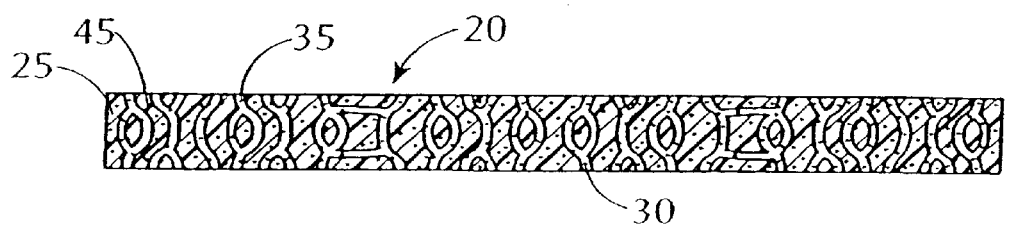
FIG. 3 is an exaggerated cross-sectional view of a portion of a container having the composition of the present invention formed into a plug insert located in the bottom of a container constructed from a polymer that acts as a transmission rate barrier.

FIG. 3 illustrates the embodiment of a plug 55 similar in construction and makeup to the plug 55 of FIG. 2, where interconnecting channels are very fine. This can result from the use of polyglycols as the hydrophilic agent, or the use of a dimer agent (i.e., a plasticizer) together with a hydrophilic agent. The dimer agent 50 may enhance the compatibility between the polymer 25 and the hydrophilic agent 35. This enhanced compatibility is facilitated by a lowered viscosity of the blend which should promote a more thorough blending of the two compounds 25,35 which resists combination into a uniform solution. Upon solidification of the composition of the present invention that has had a dimer agent added thereto, the interconnecting channels which are formed therethrough have a greater dispersion and a smaller porosity thereby establishing a greater density of interconnecting channels throughout the plug 55. In one embodiment, this same effect occurs readily when a polyglycol is used as the hydrophilic agent due to the general comparability of polyglycols with hydrophobic thermoplastics such as polyolefins. The interconnecting channels are created to provide pathways for controlled transmission of the desired property from the exterior of the solidified plug 55 to interior locations where the entrained releasing material 30 is bound.

It is believed that these interconnecting channels are required because of the hydrophobic characteristics of the polymer 25 that resist permeability therethrough and therefore acts as a barrier. For this reason, the polymer 25 itself is referred to as a barrier substance within which a releasing material 30 may be entrained. To expose the releasing material 30 entrained within the interior of the polymer 25, however, the interconnecting channels 45 are provided. Without these interconnecting channels 45, it is believed that relatively small quantities of the releasing material would be released by the entrained releasing material 30. It is further believed that these small amounts derive from the limited number of releasing material particles 30 that would be exposed at the exterior surface of the formed body and the very small amounts of the releasing agent that would be able to pass through the substantially impermeable polymer 25. Because of these characteristics, the water-insoluble polymer 25 is referred to as a barrier even though it may not be completely impermeable.

FIG. 3 illustrates an embodiment of the present invention of a plug 55 which has been deposited into a container body 60 thereby establishing a releasing container 61. The container body 60 has an interior surface 65 and is constructed substantially from the composition of the present invention. In this manner, the transmission property is resisted from being transmitted across a wall of the container 60 when the container 60 is closed. As may be seen in FIG. 3, the plug 55 has been press fit into a bottom location of the container 60. It is contemplated that the plug 55 may be merely deposited in the container 60 for loose containment therein, but it is preferable coupled to the body of the container 60 in a manner that fixes the plug 55 to the container 60. The couple between the plug 55 and the container body 60 is intended to prevent the dislocation and relative movement of the plug 55 thereabout. This connection may be accomplished by a snug press fit between the plug 55 and the interior surface 65 of the body 60, or it may be mechanically connected in such manners as adhesives, prongs, lips or ridges that extend about the plug 55 to hold the plug 55 in place. In yet another embodiment, it is contemplated that the container body 60 may be molded about the plug 55 so that during the curing process of the container body 60 the body 60 shrinks about the plug 55 thereby causing a shrink-fit to be established between the two components. This type of couplement may also be accomplished in a comolding process or sequential molding process with the same results achieved because the plug 55 will have less shrinkage than the polymer 25 comprised container body 60.

Figure 4:
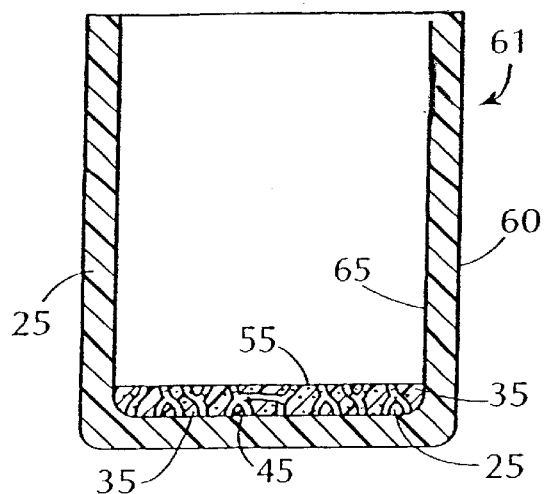
FIG. 4 is an exaggerated cross-sectional view of a portion of a container the composition of the present invention formed into a plug that has been comolded into the bottom of a container that is constructed from a polymer that acts as a transmission rate barrier.

FIG. 4 illustrates a releasing container 61 having the composition of the present invention formed of a plug 55 located at a bottom location of the container 60 similar to the configuration illustrated in FIG. 3, but the plug 55 and container body 60 are comolded so that a unified body 61 is formed with a less distinct interface between the plug 55 and body 60 components.

Figure 5:
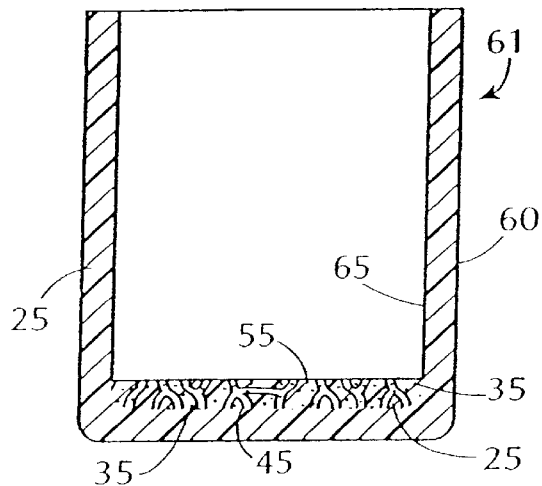
FIG. 5 is an exaggerated cross-sectional view of a portion of a container the composition of the present invention formed into a liner insert located within the interior of a container constructed from a polymer that acts as a transmission rate barrier.
Figure 6:
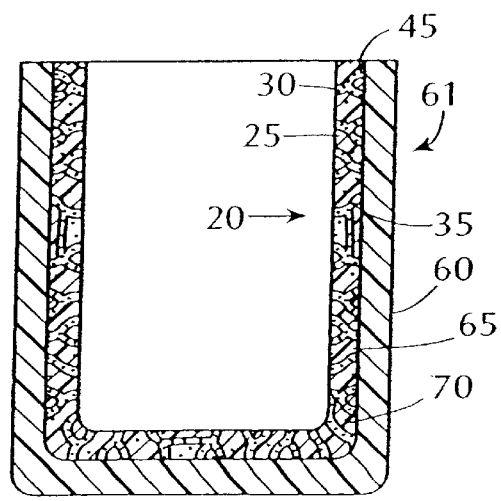
FIG. 6 is an exaggerated cross-sectional view of a portion of a container having the composition of the present invention formed into a liner that has been comolded at the interior of a container that is constructed from a polymer that acts as a transmission rate barrier.

FIGS. 5 and 6 illustrate concepts similar to those of FIGS. 3 and 4, however the proportions of the plug 55 have been extended so that a liner 70 is formed which covers a greater portion of the interior surface 65 of the container 61. The liner 70 is not localized in the bottom portion of the container body 60, but has walls which extend upwardly and cover portions of the walls of the container 61. Like the plug 55, the liner 70 may be separately molded and subsequently combined with the container body 60 or it may be comolded therewith into the unified body illustrated in FIG. 6.

Figure 7:
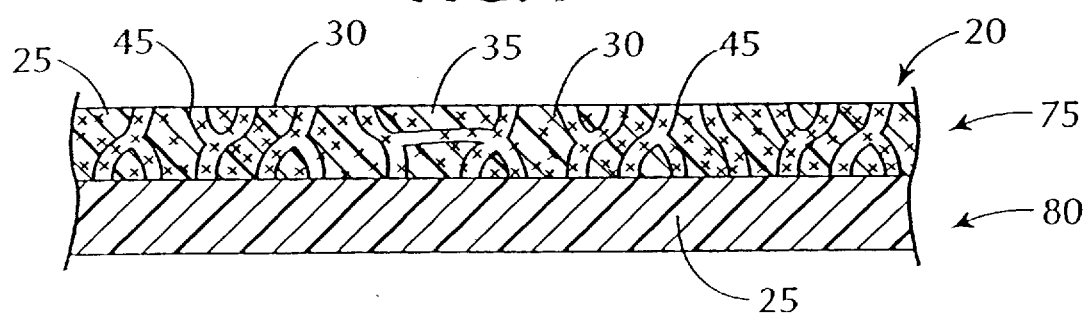
FIG. 7 is an exaggerated cross-sectional view of the composition of the present invention formed into a sheet located adjacent to a barrier sheet constructed from a polymer that acts as a transmission rate barrier.
Figure 8:
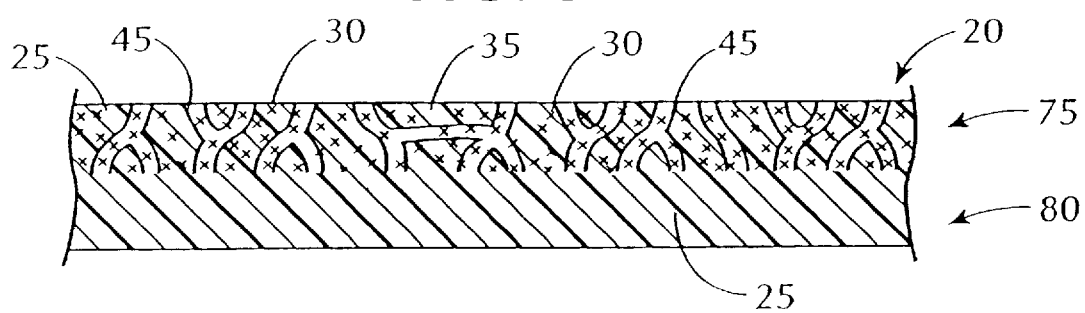
FIG. 8 is an exaggerated cross-sectional view the composition of the present invention formed into a sheet that has been comolded at an interior of a barrier sheet so that the products are integrally molded together and comprise one unified laminate.

FIGS. 7 and 8 illustrate an embodiment of the invention in which a releasing material formed of a sheet of the present invention 75 is created for combination with a barrier sheet 80. The characteristics of the sheets are similar to those described with respect to the plug 55 and liner 70 and container body 60. That is, FIG. 7 illustrates an embodiment in which the two sheets 75, 80 are separately molded, and later combined to form a packaging wrap having releasing material characteristics at an interior surface and resistant characteristics at an exterior surface. FIG. 8 illustrates a comolded process wherein an interface between the sheet 75 and the barrier sheet 80 is less distinct than in the embodiment of FIG. 7. This product can be produced by a thermal, forming process. In such a process, the polymer layer is melted and partially formed into a sheet with the releasing material 30 being deposited on top of that layer just prior to being pressed or extruded through a slit like opening in the thermal forming machine. It is contemplated that the separate sheets 75, 80 of FIG. 7 may be joined together with an adhesive or other suitable means to form a laminate from the plurality of sheets 75, 80. Alternatively, the sheeting 75, 80 may be manufactured from a thermal extrusion process whereby both sheets 75, 80 are manufactured at the same time and effectively comolded together to form the embodiment illustrated in FIG. 8.

In a further embodiment of the present invention, a plug 55 is formed from the mixture for inclusion within a container 60 that is constructed from a barrier substance. In one embodiment, the plug 55 is deposited into a container 60 that is constructed from a barrier substance. In this manner, a container 61 is created. The plug 55 may be coupled to an interior surface of the container body 60 so that the plug 55 is fixed relative to the container 60.

Alternatively, a container 60 constructed from a barrier substance may be molded about the plug 55 so that at least a portion of the plug 55 is exposed to an interior of the container 60. A desiccating plug 55 made according to the present invention may also be co-molded with a container 60 that is constructed from a barrier substance so that at least a portion of the plug 55 is exposed to an interior of the container 60.

In another embodiment, a liner 70 may be formed from the mixture 40 and then be included within a container 60 constructed from a barrier substance. The liner 70 typically, but not necessarily, has an exterior surface configured for mating engagement with an interior surface 65 of the container 60.

The liner 70 may be pressed into mating engagement with the container 60 so that a container 61 is created wherein at least a majority of the interior surface 65 of the container is covered by the liner 70.

The liner 70 may be formed from the mixture 40 and then a container 60 constructed from a barrier substance may be molded about the liner 70 so that at least a portion of the liner 70 is exposed to an interior of the container 60 and a majority of an interior surface 65 of the container 60 is covered by the liner 70.

Alternatively, the liner 70 and container body 60 may be comolded together into a unified body.

The absorbing sheet 75 is combined with a barrier sheet 80 that is constructed of a barrier substance for use as a packaging wrap.

The sheets 75, 80 may be laminated by thermal extrusion.

A dimer agent may optionally be added to the mixture to increase the mixing compatibility of the polymer 25 and the channeling agent 35 thereby increasing the dispersion of the passages within the solidified mixture.

In still another embodiment of the present invention, a method for making a releasing material formed in the shape of container 61 is provided. The method includes forming a container 60 from substantially air and moisture impermeable material so that an air and moisture barrier is created between an interior and exterior of the container. An insert is formed from composition of the present invention. The insert has an exterior surface that is configured for mating engagement with at least a portion of an interior surface 65 of the container 60. The insert is installed into the interior of the container 60 so that at least a portion of the exterior surface of the insert abuttingly engages the interior surface 65 of the container 60. The engagement fixes the insert relative to the container 60 and resists disengagement of the insert from the container 60. The insert is exposed to the interior of the container 60 for releasing the desired property. The insert is pressed into the interior of the container 60 with sufficient force that the insert fits tightly within the container 60 thereby resisting disengagement therefrom. The insert is sized and shaped so that the insert fits snugly into a receiving location within the interior of the container for retention at the receiving location.

In another embodiment, the insert is sized and shaped into a plug 55 that fits snugly into a receiving location at a bottom portion of the interior of the container 60 for retention at the receiving location.

In a further embodiment, the insert is configured into a liner 70 having an exterior surface that conforms to the interior surface 65 of the container 60 so that a majority of the liner's 70 exterior surface is in abutting engagement with the container's 60 interior surface 65. The container 60 and the liner 70 are similarly configured so that the interior 65 of the container 60 and the exterior of the liner 70 fit snugly together so that disengagement of the liner 70 from the container 60 is resisted.

In another example, the container 60 may be molded from a plastic that is substantially impermeable and therefore resists the transmission of the releasing material across the boundary of the container 60 between its exterior and its interior. Also, the liner 70 may be molded from the composition of the present invention.

In yet another embodiment, a method for making a releasing material formed in the shape of container 61 is provided. A container is formed from substantially air and moisture impermeable material so that a barrier is established between an interior and exterior of the container 60. A substantially solid tablet or plug 55 is formed from the composition of the present invention 20, the tablet 55 being suitably sized to fit within the interior of the container 60. The tablet 55 is then deposited into the interior of the container 60 thereby establishing a means for releasing the desired material from the interior of the container 60 when the container 60 is closed about the tablet 55.

In another embodiment of the present invention, a method for making a releasing material in the shape of a package is provided. An outer skin, sheet, or layer 80 is formed from a substantially air and moisture impermeable sheet of material so that a barrier is created between opposite sides of the skin. An inner skin, sheet, or layer 75 is formed from the composition of the present invention 20 at one side of the outer skin 80. A package is formed about a product or item by sealing the product or item within the outer impermeable skin 80 and with the inner releasing material skin 75 located adjacent to the product. A releasing material laminate may be formed by suction vacuum molding the outer skin 80 and the inner skin 75 together to form the package.

In one embodiment of the present invention, a releasing material in the form of an enclosure 61 is provided. The enclosure includes a container 60 formed from substantially moisture and air impermeable material so that a barrier is created between an interior and exterior of the container 60. A liner 70 is formed from the composition of the present invention 20 so that the liner 70 has an exterior surface configured for mating engagement with at least a portion of an interior surface 65 of the container 60. The liner 70 is inserted into the interior of the container 60 so that at least a portion of the exterior surface of the liner abuttingly engages the interior surface 65 of the container 60. The engagement fixes the liner 70 relative to the container 60 and resists disengagement of the liner 70 from the container 60.

In another embodiment of the present invention, a releasing material in the form of an insert for a closable container 60 includes an insert made from the composition of the present invention is configured for installation into a closable container 60. The insert 25 is constructed from the composition of the present invention. The insert 25 has passages extending from its exterior surface into its interior.

The present invention will be illustrated in greater detail by the following specific examples. It is understood that these examples are given by way of illustration and are not meant to limit the disclosure or claims. For example, although the following examples were tested at 10% Rh and 20% Rh at 72° F., the composition of the present invention is also suited for other conditions. Moreover, these examples are meant to further demonstrate that the present invention has interconnecting channels and that the hydrophilic agents reside in the interconnecting channels. All percentages in the examples or elsewhere in the specification are by weight unless otherwise specified.

EXAMPLE 1

The purpose of the following example is to demonstrate that the composition of the present invention has interconnecting channels by subjecting the following materials to a swelling and weight loss analysis. In addition, the following example demonstrates that the composition of the present invention is able to release a substance (e.g., poly(ethylene glycol)).

A. Preparation of Samples

Film #1: A blend of about 93% (w/w) of polypropylene (Exxon Chemicals, tradename Escorene® polypropylene 3505G) and about 7% (w/w) of poly(ethylene glycol) (Dow Chemical, tradename E-4500) was sufficiently mixed to produce a uniform blend. The blend was then fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #2: A blend of about 68% (w/w) of polypropylene (Exxon Chemicals, tradename Escorene® polypropylene 3505G) and about 3505G), about 12% (w/w) of poly (ethylene glycol) (Dow Chemical, tradename E-4500) and about 20% (w/w) of a desiccant of molecular sieve (Elf Atochem, tradename Siliporite® molecular sieve, 4 Angstrom) was sufficiently mixed to produce a uniform blend. The blend was then fed through a Leistritz twin screw extruder at temperatures in the sixteen zones ranging from about 145° C. to about 165° C., at a feed rate of about 40 lbs/hr at a screw speed of about 460 rpm and a six inch die. The extruded composition was then fed through a three roll hot press at temperatures ranging from about 85 to about 92° C. to produce a film of about 4 mil.

Film #3: A blend of about 34.88% (w/w) of polypropylene (Exxon Chemical, tradename Escorene® polypropylene 3505G), about 11.96% (w/w) of poly(ethylene glycol) (Dow Chemical, tradename E-4500), about 52.82% (w/w) of a desiccant of molecular sieve (Elf Atochem, tradename Siliporite® molecular sieve, 4 Angstrom) and about 0.34% (w/w) of a grey colorant was sufficiently mixed to produce a uniform blend. The blend was then fed through a Leistritz twin screw extruder at temperatures in the sixteen zones ranging from about 145° C. to about 165° C., at a feed rate of about 50 lbs/hr at a screw speed of about 460 rpm and a six inch die. The extruded composition was then fed through a three roll hot press at temperatures ranging from about 85 to about 92° C. to produce a film of about 4 mil.

B. Swelling and Weight Loss Analysis

Figure 9:
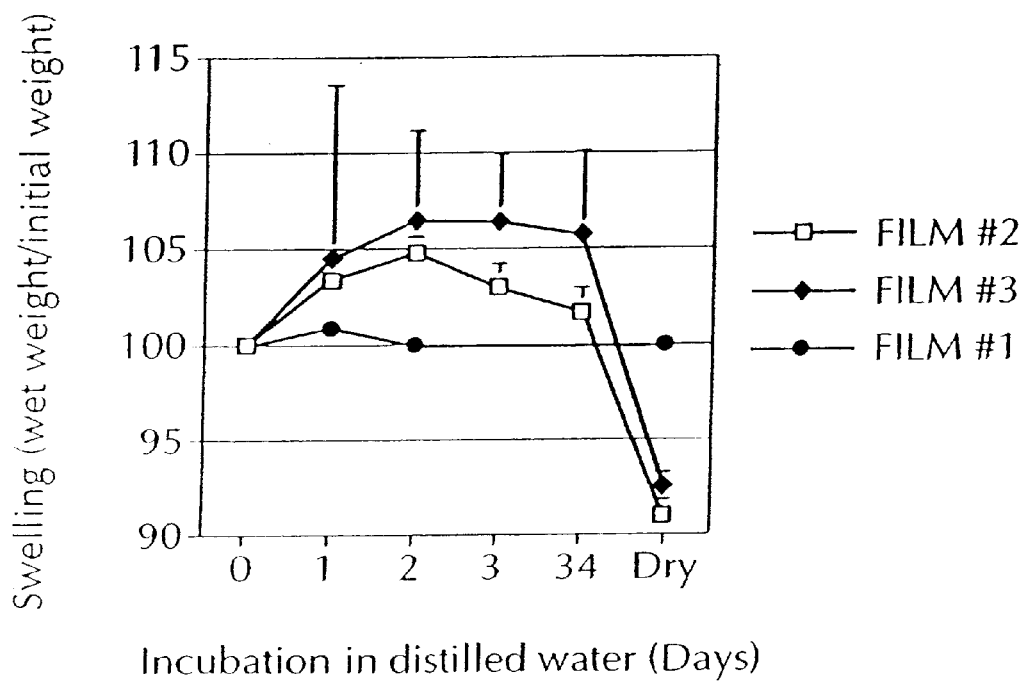
FIG. 9 is a graphical view of a swelling and weight loss analysis of three film samples: Film #2, Film #3 and Film #4.

Circular disks (OD 1.1 cm) were cut from each of the three samples. Initial dry weights of each sample was recorded. Samples were subsequently incubated in 2.0 ml distilled water and left shaking at room temperature. Periodically at 1, 2, 3, and 34 days, the disks were removed, the surface blotted dry and the sample weighed, to determine the extent of swelling. At each timepoint, the distilled water was replaced to provide for sink conditions. At the end of the study, the samples were lyophilized to remove the water and the sample weighed to determine mass loss. FIG. 9 is a graph of the result of the analysis. Percent swelling is defined as the wet weight at a time point (t), divided by initial dry weight (zero) and multiplied by 100. 'Dry' indicates the final lyophilized sample weight following the 34 day incubation.

FIG. 9 shows film #1 did not swell or lose weight over the course of 34 days. Thus, it is believed that this result shows that the poly(ethylene glycol) (i.e., hydrophilic agent) was completely entrapped in the polypropylene (i.e., water-insoluble polymer). Film #2 gained approximately 3% of its initial weight by swelling and lost approximately 9% of its initial weight at the end of the 34 days of incubation. Film #3 gained approximately 6% of its initial weight and lost approximately 8% of its initial weight at the end of the 34 day incubation period. These results demonstrate that interconnecting channels from the exterior through the interior exist in the composition of the present invention because water penetrated films #2 and #3 and a substantial portion of the water soluble component (e.g., poly(ethylene glycol)) of films #2 and #3 was extracted from the polymer.

EXAMPLE 2

The purpose of the following example is to demonstrate that the composition of the present invention has two separate phases consisting of a water-insoluble polymer and a hydrophilic agent.

A. Preparation of Samples

Film #4: 100% polypropylene (Exxon Chemicals, tradename Escorene® polypropylene 3505G) was fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #5: A blend of about 88% (w/w) of polypropylene (Exxon Chemicals tradename Escorene® polypropylene 3505G), about 12% (w/w) of poly(ethylene glycol) (Dow Chemical, tradename E-4500) was sufficiently mixed to produce a uniform blend. The blend was then fed through a Leistritz twin screw extruder at temperatures in the sixteen zones ranging from about 145° C. to about 165° C., at a feed rate of about 40 lbs/hr, at a screw speed of about 460 rpm and a six inch die. The extruded composition was then fed through a three roll hot press at temperatures ranging from about 85° C. to about 92° C. to produce a film of about 4 mil.

Film #7: A blend of about 68% (w/w) of polypropylene (Exxon Chemicals, tradename Escorene® polypropylene 3505G), about 12% (w/w) of poly(ethylene glycol) (Dow Chemical, tradename E-4500) and about 20% (w/w) of a desiccant of molecular sieve (Elf Atochem, tradename Siliporite® molecular sieve, 4 Angstrom) was sufficiently mixed to produce a uniform blend. The blend was then fed through a Leistritz twin screw extruder at temperatures in the sixteen zones ranging from about 145° C. to about 165° C., at a feed rate of about 12 lbs/hr, at a screw speed of about 460 rpm and a six inch die. The extruded composition was then fed through a three roll hot press at temperatures of about 105° C. to produce a film of about 4 mil.

B. Thermal Analysis Using Differential Scanning Calorimetry ("DSC")

The processed film samples were analyzed using a Perkin Elmer DSC7 equipped with a TAC 7DX thermal controller. Data were analyzed using Perkin Elmer Pyris software (version 2.01). Samples were heated from −50 to 250° C. at a rate of 10 or 15° C./min, then cooled at the same rate and then heated once again to 250° C. at the same rate. The following table is the date collected from the DSC. The melting point data is given as the melting point peak (° C.) and enthalpy (ΔH, joules/gm) for the first heating ramp (1°) and the second heating ramp (20°). The column referring to FIGS. 10 through 18 is the graphical output from the DSC that corresponds to the date from the table. Since the samples are only heated to 250° C., the molecular sieve in film samples #2, #3 and #7 was not melted and thus, no melting point date was recorded.

Figure 10:
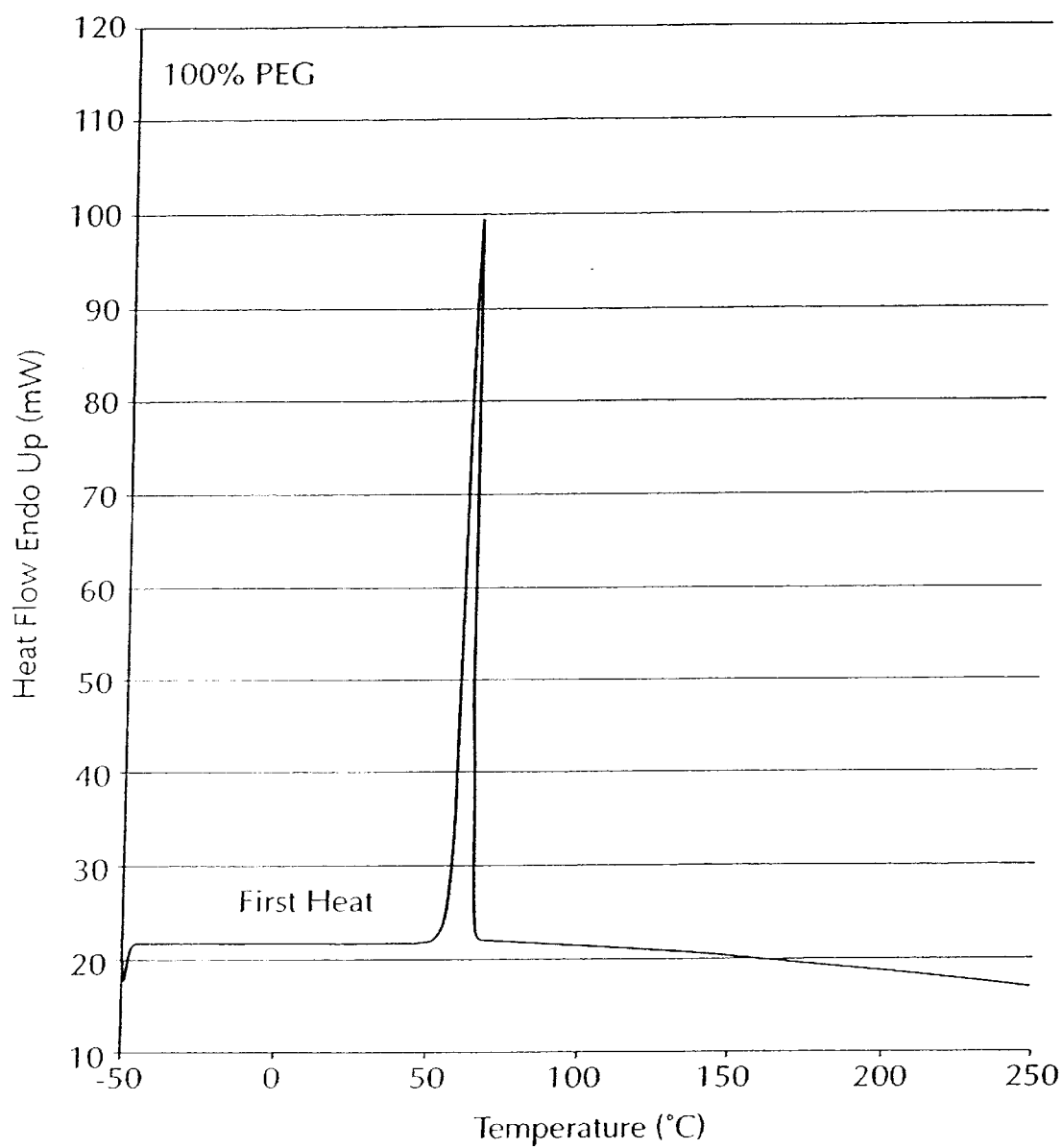
FIG. 10 is a graphical view of a DSC curve of a sample of 100% polyglycol.
Figure 11:
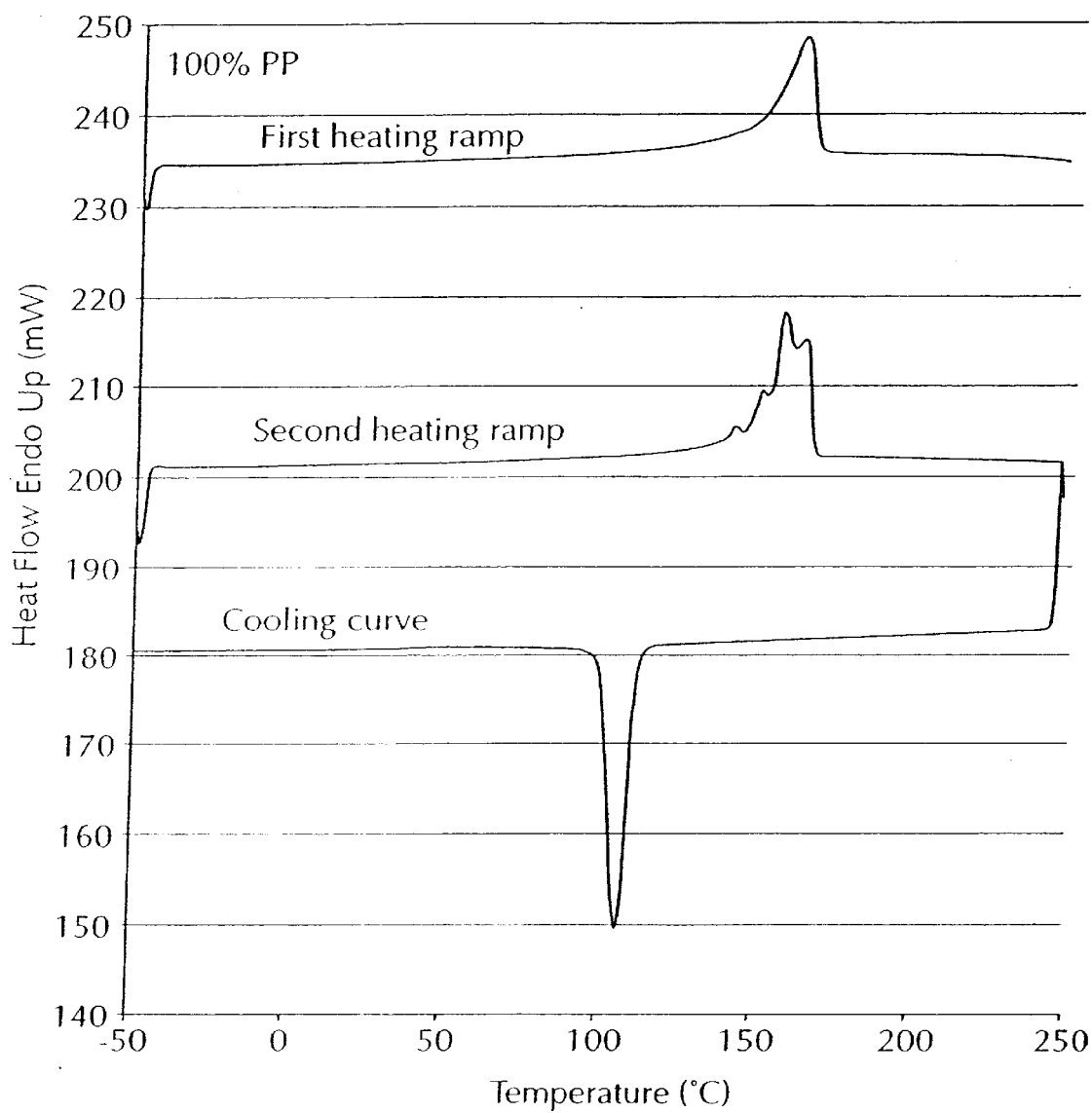
FIG. 11 is a graphical view of a DSC curve of a sample of Film #4.
Figure 12:
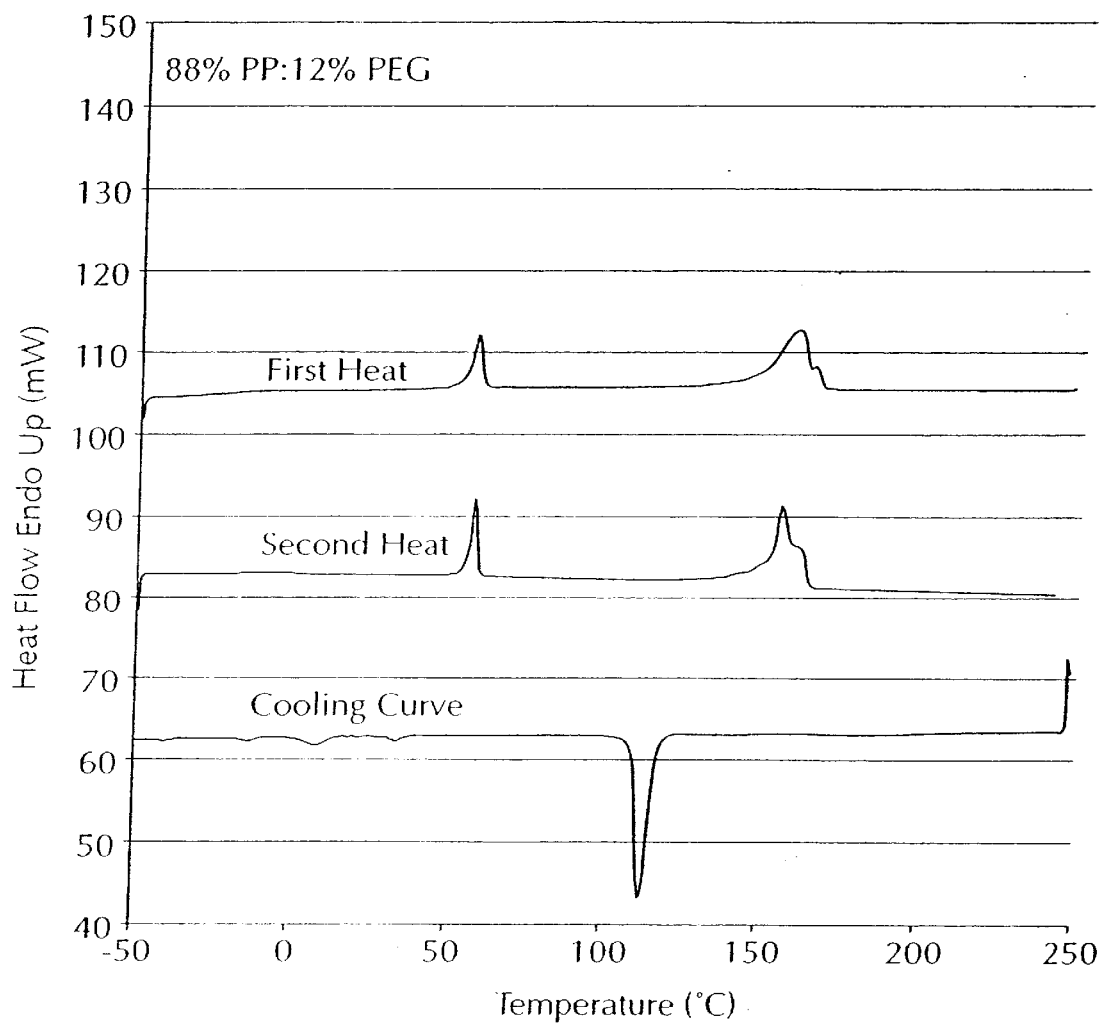
FIG. 12 is a graphical view of a DSC curve of a sample of Film #5.
Figure 13:
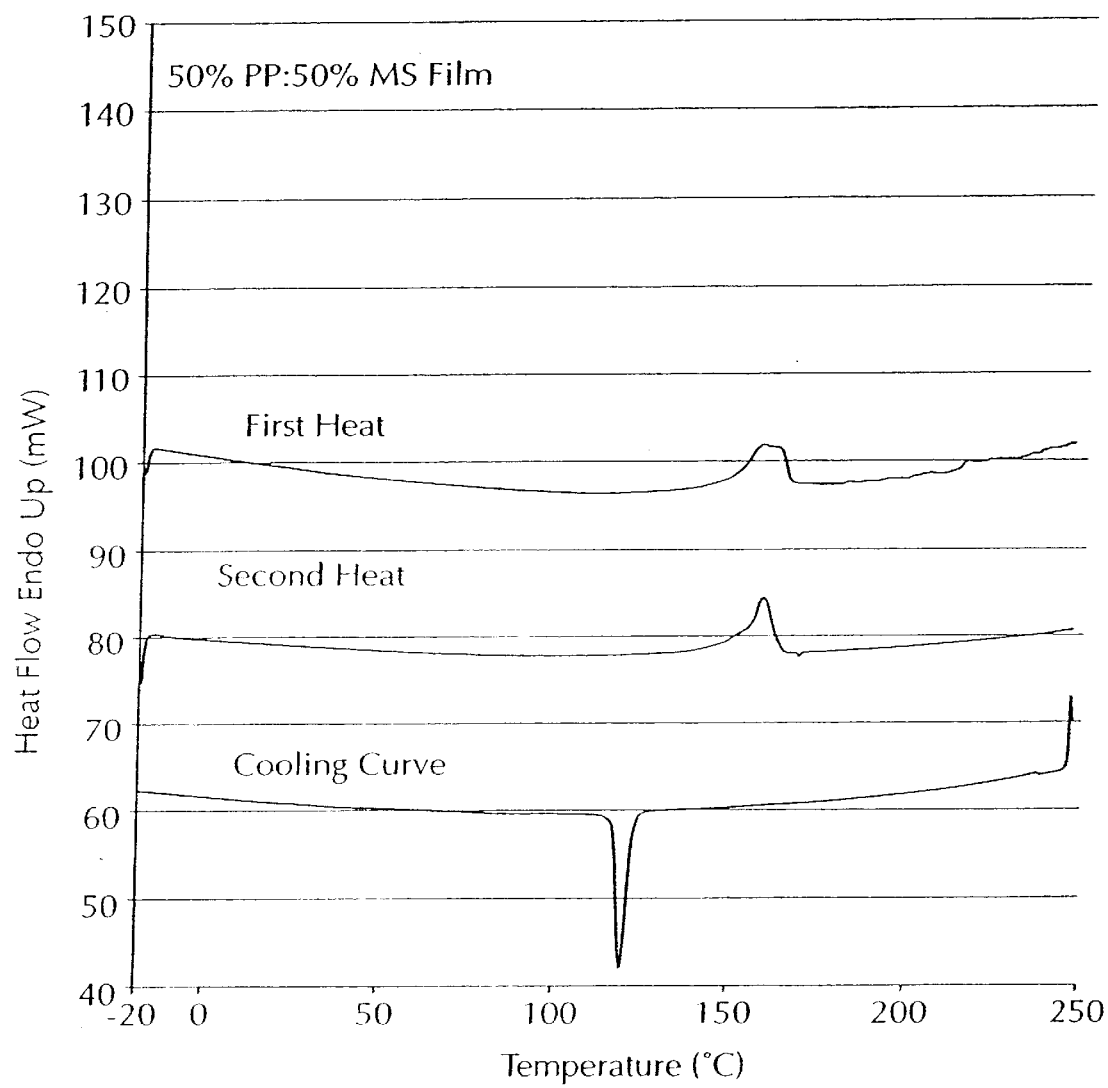
FIG. 13 is a graphical view of an DSC curve of a sample of Film #6.
Figure 14:
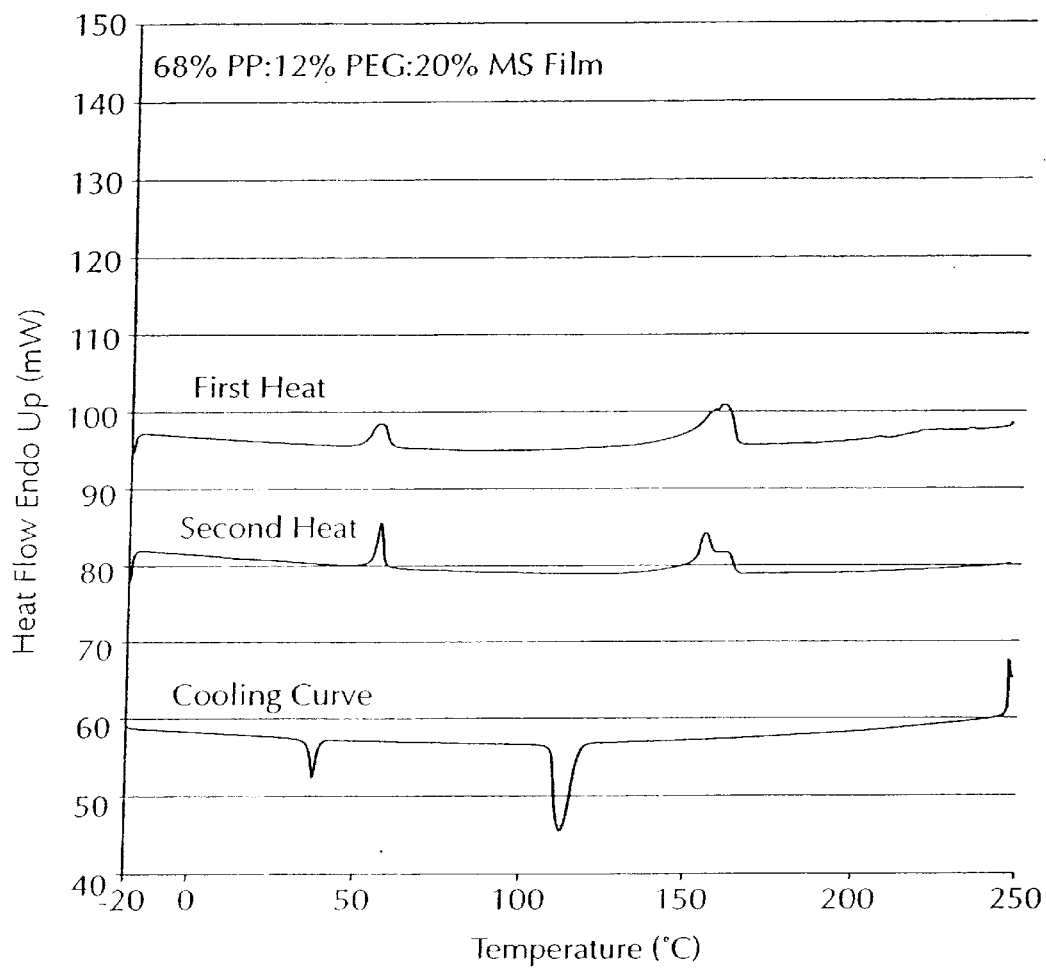
FIG. 14 is a graphical view of a DSC curve of a sample of Film #7.
Figure 15:
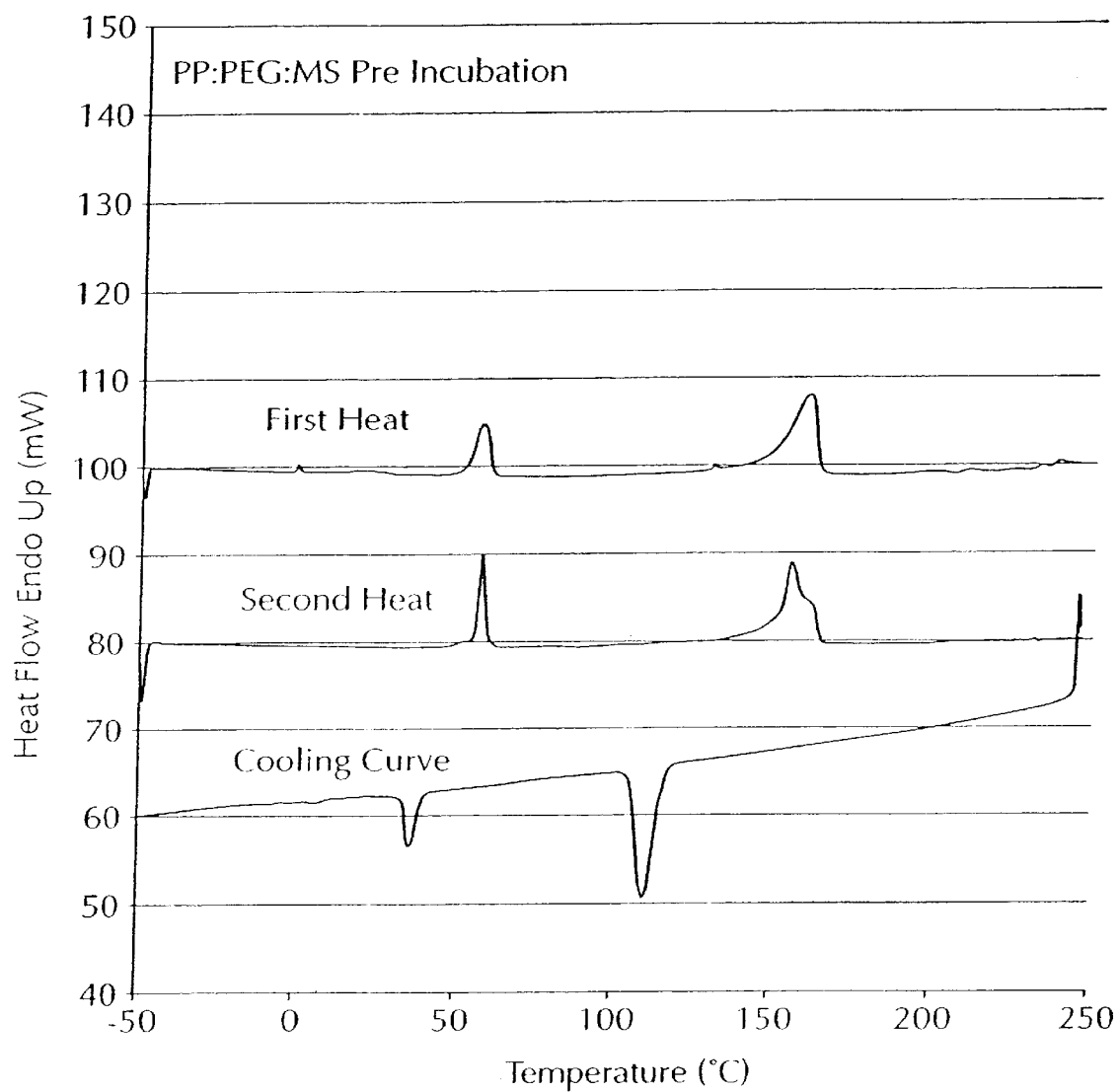
FIG. 15 is a graphical view of a DSC curve of a sample of Film #2 in a pre-incubation state.
Figure 16:
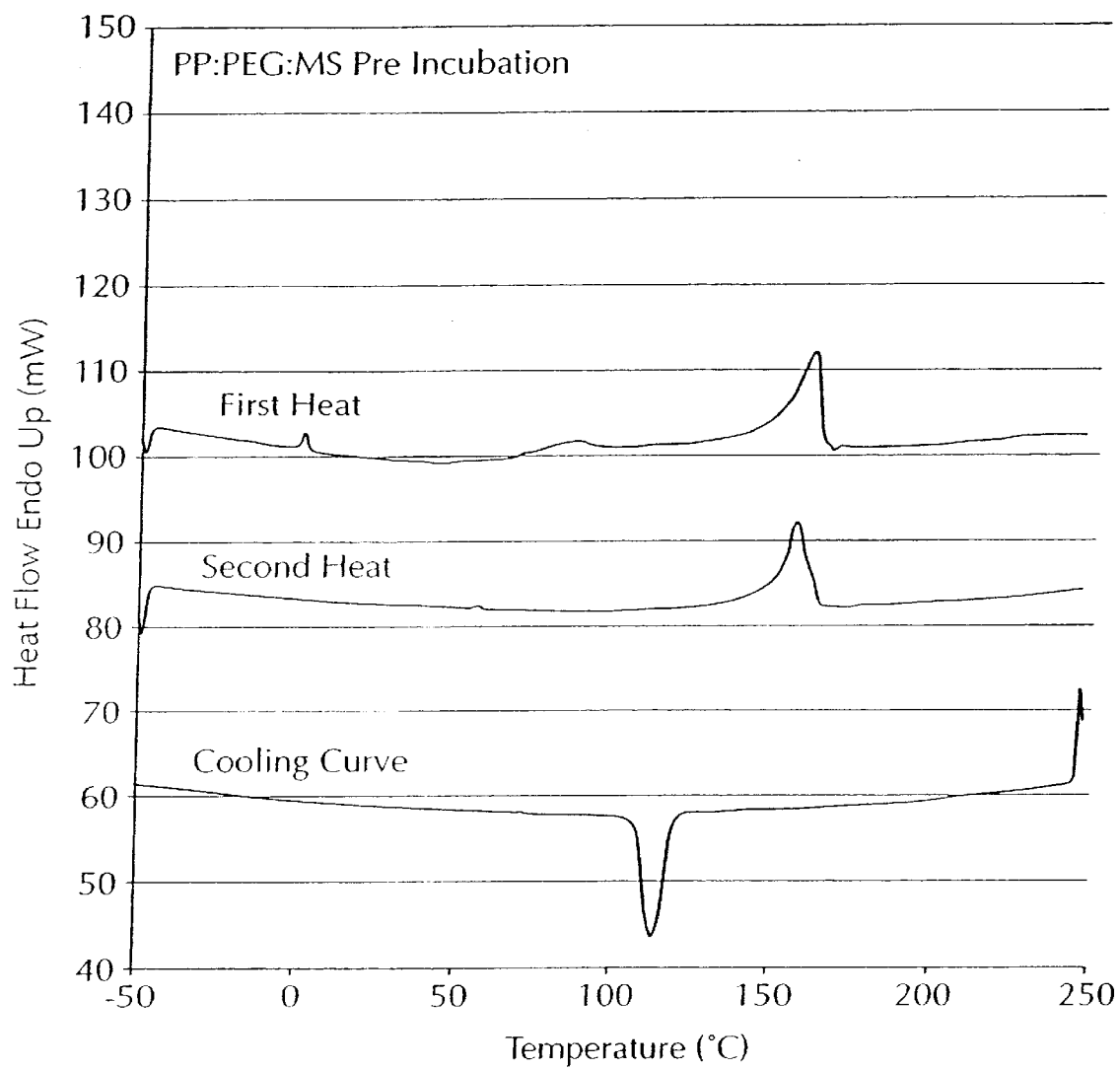
FIG. 16 is a graphical view of a DSC curve of a sample of Film #2 in a post-incubation state.
Figure 17:
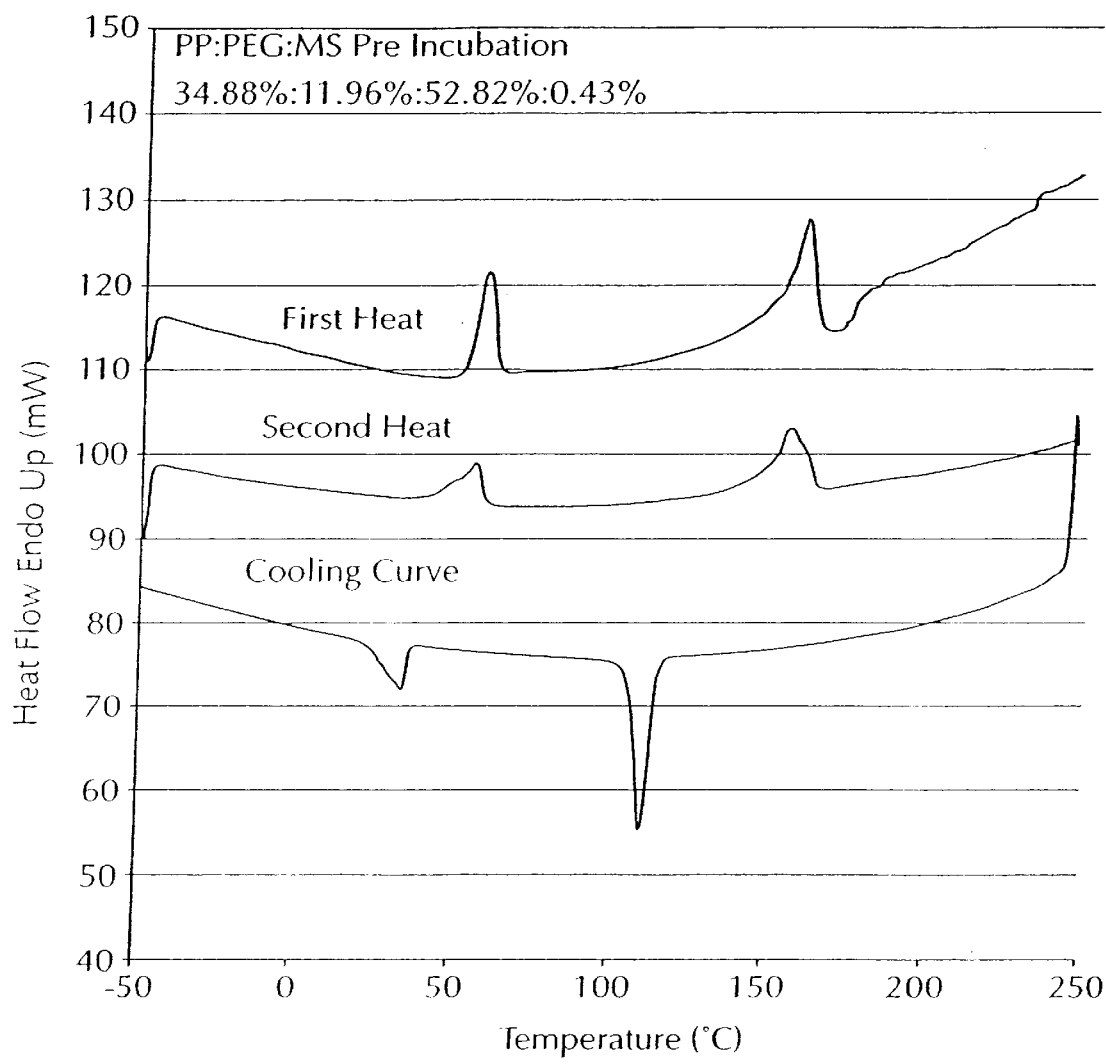
FIG. 17 is a graphical view of a DSC curve of a sample of Film #3 in a pre-incubation state.
Figure 18:
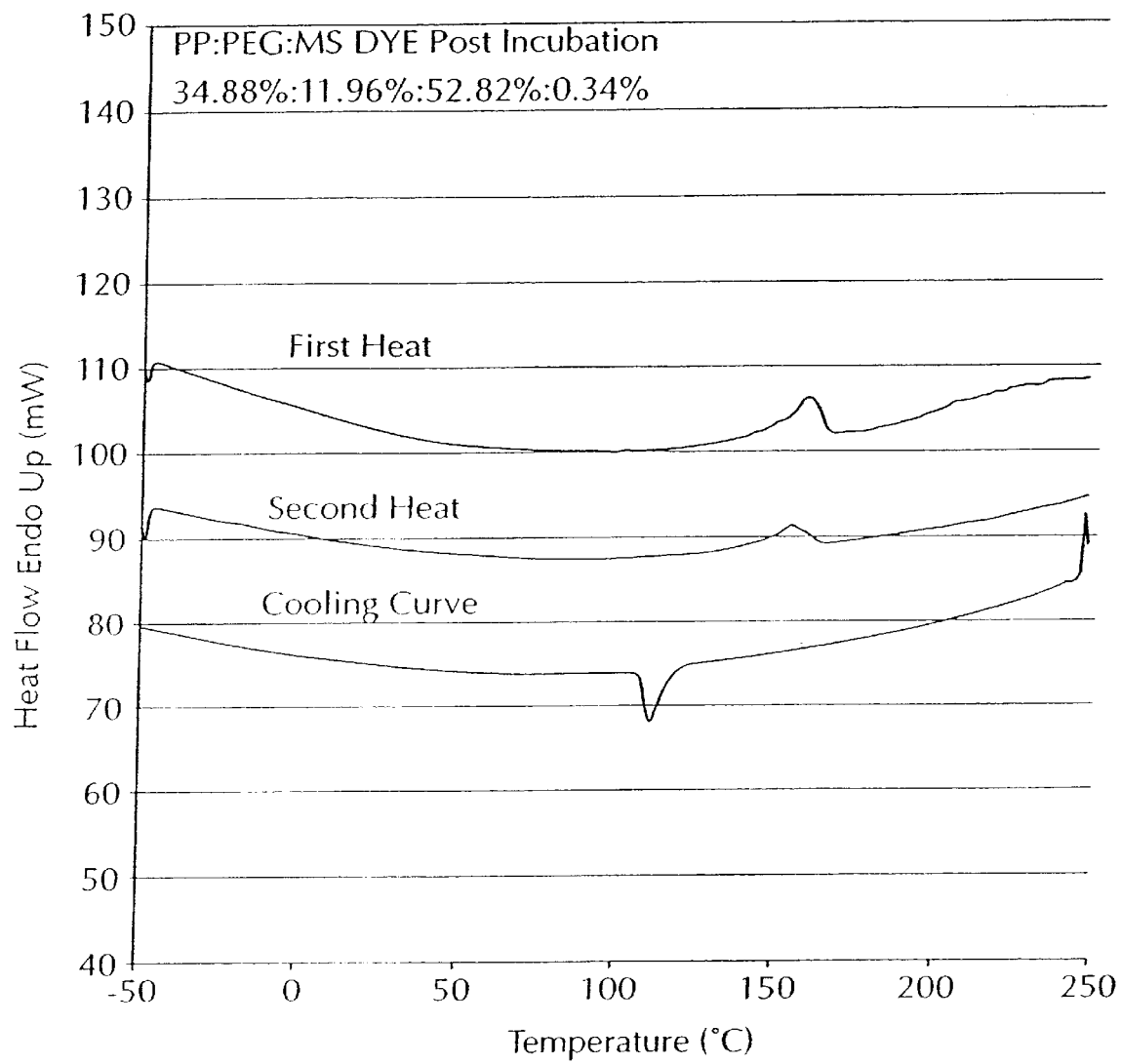
FIG. 18 is a graphical view of a DSC curve of a sample of Film #3 in a post-incubation state.

| Sample | FIG. # | PEG Peak° C. | PEG ΔH J/g | PP Peak° C. | PP ΔH J/g |
|---|---|---|---|---|---|
| 100% poly(ethylene glycol) | FIG 10 | 1° 63.808 | 190.362 | none | None |
| Film #4 | FIG 11 | 1° none | None | 162.700 | 78.462 |
|  |  | 2° none | None | 157.200 | 96.123 |
| Film #5 | FIG 12 | 1° 57.700 | 22.253 | 161.700 | 80.524 |
|  |  | 2° 58.033 | 20.361 | 157.366 | 79.721 |
| Film #6 | FIG 13 | 1° none | None | 159.366 | 42.385 |
|  |  | 2° none | None | 160.033 | 42.876 |
| Film #7 | FIG 14 | 1° 56.366 | 19.460 | 162.200 | 70.073 |
|  |  | 2° 57.200 | 17.094 | 156.866 | 58.038 |
| Film #2 [pre-incubation] | FIG 15 | 1° 58.554 | 20.845 | 163.062 | 60.577 |
|  |  | 2° 58.779 | 16.037 | 157.783 | 53.706 |
| Film #2 [post-incubation] | FIG 16 | 1° 55.804 | 0.379 | 163.062 | 86.215 |
|  |  | 2° 57.529 | 0.464 | 158.533 | 67.949 |
| Film #3 [pre-incubation] | FIG 17 | 1° 59.308 | 18.849 | 162.562 | 40.291 |
|  |  | 2° 56.529 | 10.122 | 158.283 | 24.980 |
| Film #3 [post-incubation] | FIG 18 | 1° 55.554 | 0.138 | 160.562 | 46.931 |
|  |  | 2° none | None | 156.033 | 26.081 |

The 100% poly(ethylene glycol) sample, exhibits a single melting point at 63° C. while film #4 100% polypropylene has a melting point at 157° C. Film #5 displayed both peaks at 58° C. (poly(ethylene glycol)) and 157° C. (polypropylene), which indicates that the two polymers were phase separated. If the polymers were not phase separated but mixed, then the peaks would not be at the melt temperatures of the pure polymers, but shifted. Film #6 shows only the distinct polypropylene peak at 160° C. The molecular sieves do not melt in this temperature range or affect the melting temperature of pure polypropylene. Film #7 again shows two distinct peaks: one for poly(ethylene glycol) at 57° C. and one for polypropylene at 157° C. indicating that in the three component mixture, all are phase separated.

Film samples #2 and 3 were part of the swelling and weight loss analysis presented in Example 1. Once again two distinct peaks were evident: one for poly(ethylene glycol) at 59° C. and one for polypropylene at 158° C. indicating that in the three component mixture, all components were phase separated. However when the polymer film was incubated in water for 34 days at room temperature (File #2: post-incubation) and tested by DSC, the positions of the peaks remained the same indicating the components were still phase-separated. However the area of the poly(ethylene glycol) peak (indicated by delta H, enthalpy) was greatly reduced. This result indicated that poly(ethylene glycol) had been extracted by the prolonged water incubation. Also, the result provided further confirmation for the weight loss data presented in Example 1 and demonstrated that the poly(ethylene glycol) component was mostly extracted by means of interconnecting channels in the bulk polypropylene matrix.

Film sample #3 showed the same effect as Film sample #2. The polypropylene delta H peak was not detectable (Film #3: post-incubation), demonstrating nearly complete extraction of poly(ethylene glycol) during water incubation. This confirmed the weight loss result of Example 1 in which the same film lost approximately 8% of it's initial weight. The poly(ethylene glycol) composition of the sample was approximately 12% (w/w).

In addition, the glass transition ($T_g$) analysis from the DSC data of the samples of the present invention also demonstrate that the water-insoluble polymer and the material exist in separate phases. Pure polypropylene exhibits a $T_g$ of about −6° C. while pure poly(ethylene glycol) exhibits a $T_g$ at about −30° C. DSC data from film #5 exhibit two distinct $T_g$'s, which correspond to the respective polymers (6° C. for polypropylene and −30° C. for poly(ethylene glycol) and thus, indicates, further that the two components are phase separated.

EXAMPLE 3

The purpose of the following example is to demonstrate that the composition of the present invention has interconnection channels and has the water absorbing material intermixed within the hydrophilic agent.

A. Scanning Electron Microscopy ("SEM") Method

The structural properties of the films was imaged using a Hitachi S-2700 microscope operating at 8 kV accelerating voltage to minimize irradiation damage. Each film sample was visualized in three perspectives: 1) the film surface; 2) the fractured film cross-section (0°) and 3) the fractured film cross-section at a 90° angle with respect to orientation #2 (90°). Pre-incubation film samples were directly sputter coated with a 5–10 nm layer of gold-palladium with a Polaron Instruments Sputter Coater E5100. Post-incubation samples were incubated at room temperature for 24 hrs in 10 ml of 70% ethanol (w/v) with agitation. The ethanol was discarded and the samples were air-dried overnight. Samples were then frozen and lyophilized overnight to remove any residual moisture and then sputter coated.

B. Morphology of Film Samples

Figure 19A:
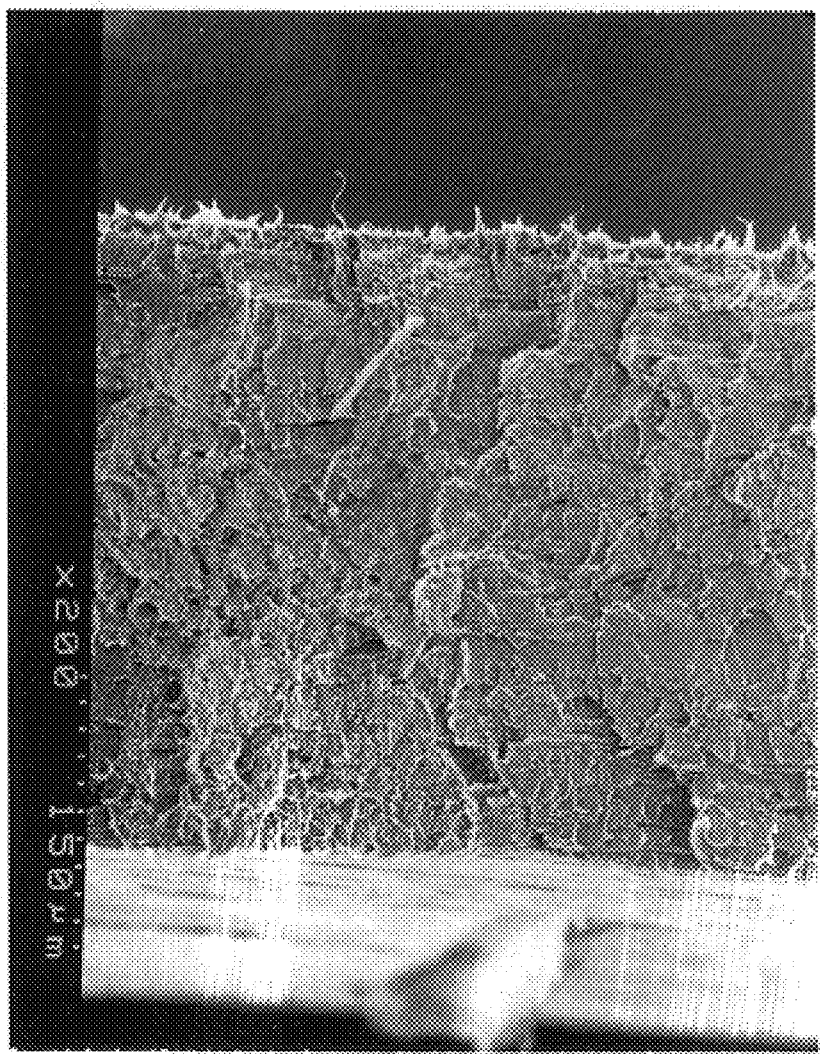
FIGS. 19a–c are scanning electron photomicrographs of a film sample of Film #4.
Figure 19B:
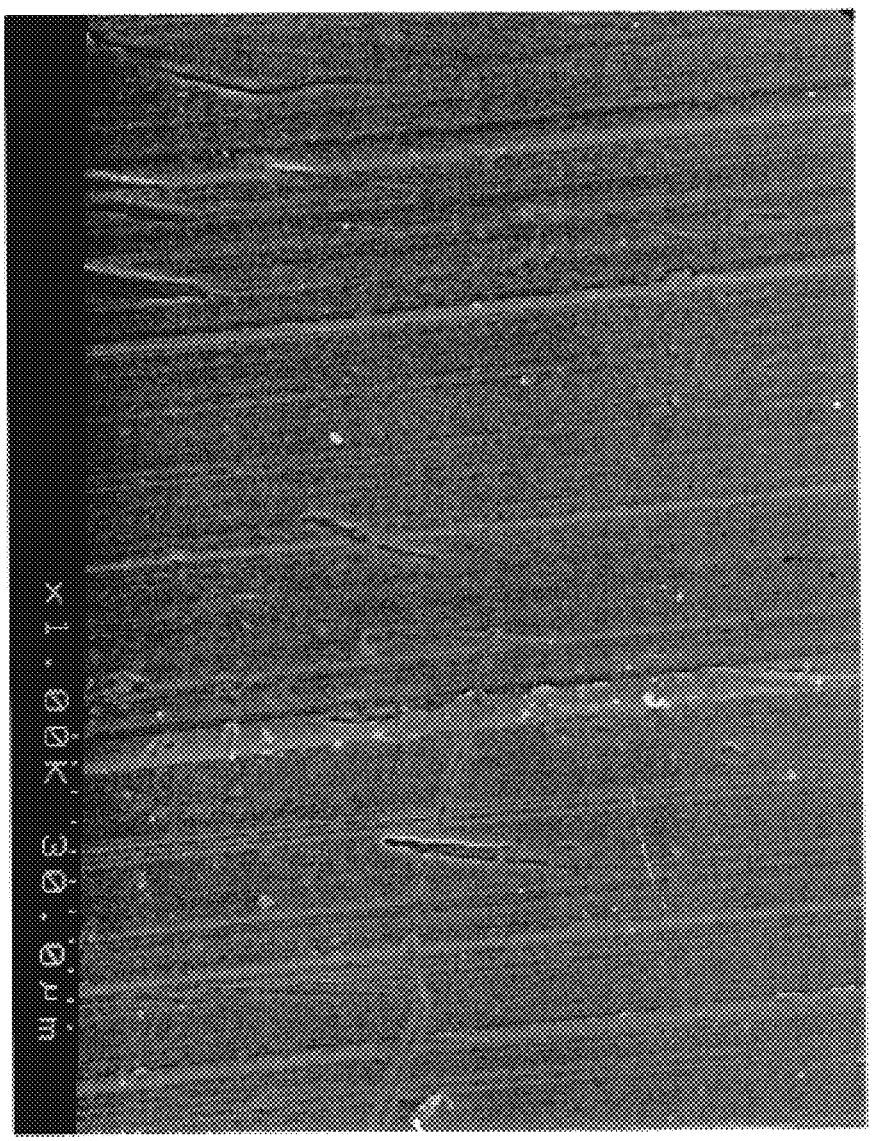
Figure 19C:
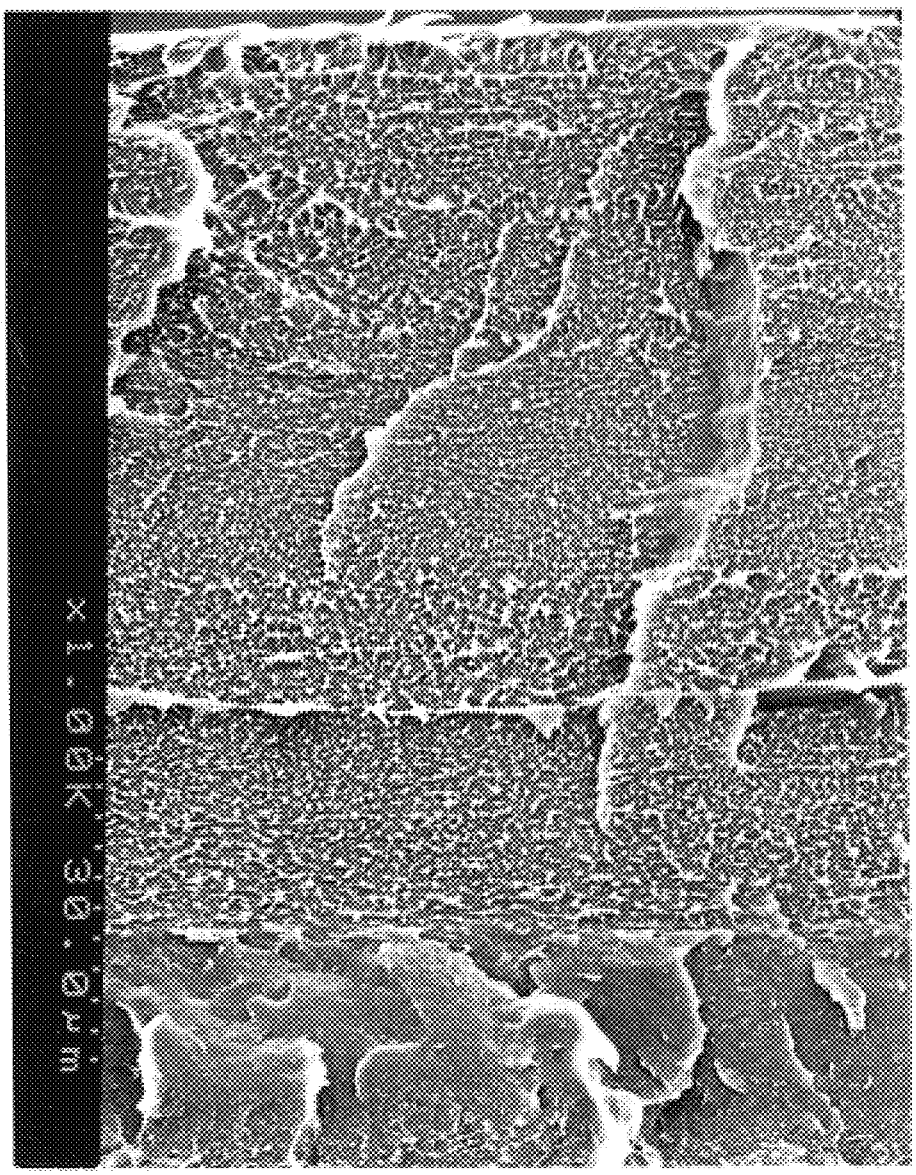

FIGS. 19a–c are scanning electron photomicrographs of film sample #4—100% polypropylene. FIGS. 19a–c illustrate that a water-insoluble polymer is typically a dense, homogenous morphology with substantially no porosity. The outer surface is shown in FIG. 19a FIG. 19a shows an outer surface that is dense and displaying substantially no porosity. The cross-sectional view is shown in FIG. 19b at a magnification of 200 times. FIG. 19b shows plate-like domains of polymer that were revealed during brittle facture of the film. Another cross-sectional view is shown in FIG. 19c at a magnification of 1000 times. FIG. 19C shows a dense, fibrillar morphology.

Figure 20A:
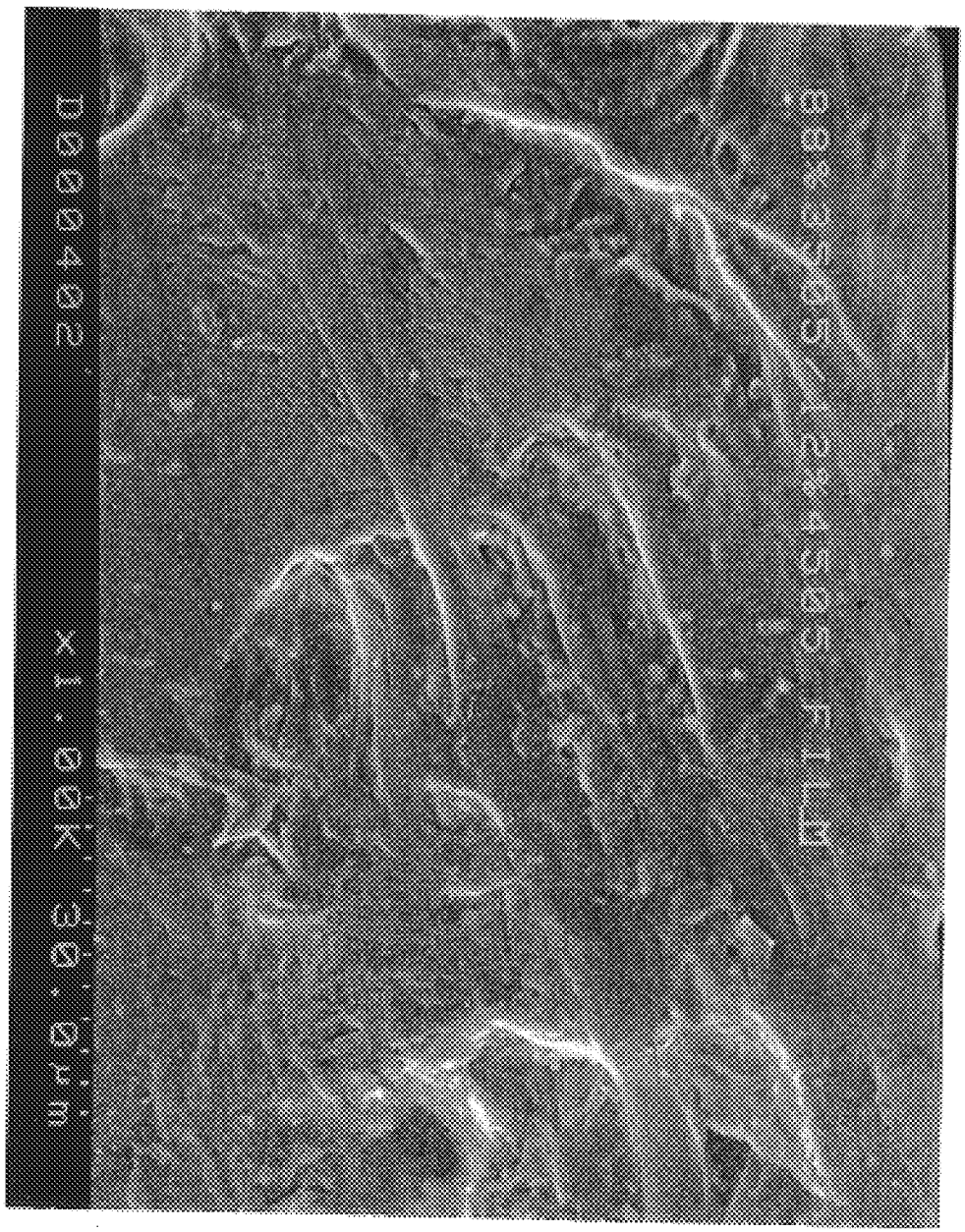
FIGS. 20a–c are scanning electron photomicrographs of a film sample of Film #5.
Figure 20B:
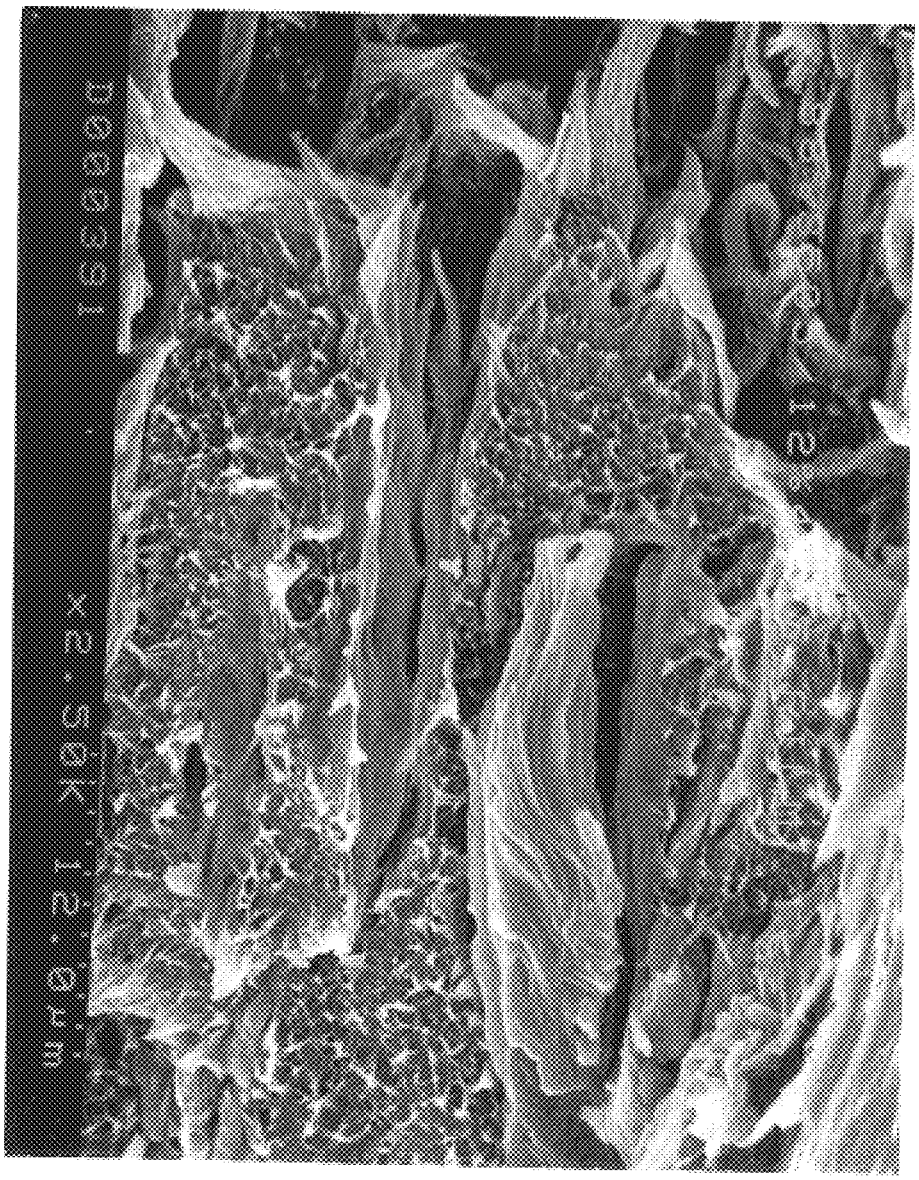
Figure 20C:
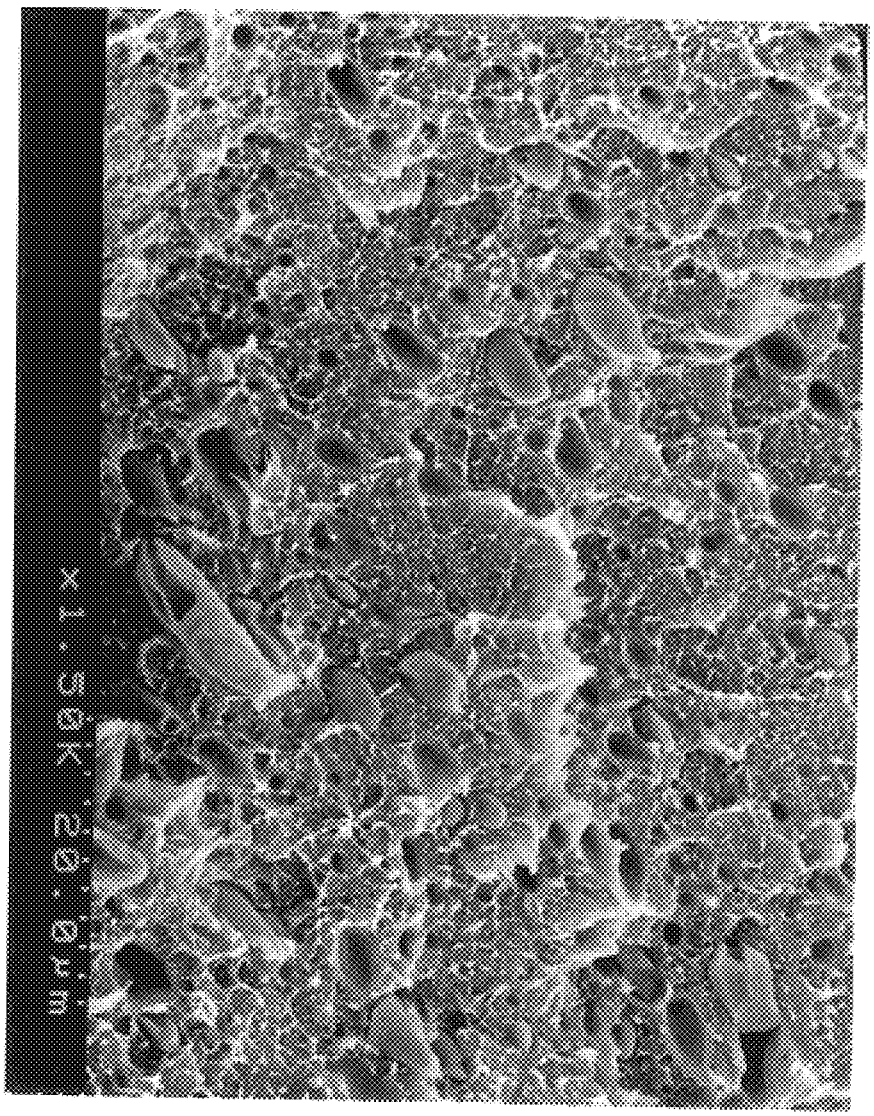

FIGS. 20a–c are scanning electron photomicrographs of film samples #5—about 88% polypropylene and 12% poly (ethylene glycol). FIGS. 20a–c illustrate that a two phase system consisting essentially of a water-insoluble polymer and hydrophilic agent has a heterogeneous morphology with dense fibrallar matrix interspersed with domains of lamellar structures, which is the poly(ethylene glycol). FIGS. 20a–c further show voids between lamellar fibrillar and fibrillar structures that are channels and are oriented in the same direction. The outer surface is shown in FIG. 20a at a magnification of 1000 times. FIG. 20a shows an outer surface that is dense and displaying substantially no porosity. The cross-sectional view is shown in FIG. 20b at a magnification of 2,500 times. FIG. 20b shows fibrillar domains of polymer coated with lamellar strands of poly (ethylene glycol). FIG. 20c is a cross-sectional view of film sample #5 fractured a perpendicular angle and at a magnification of 1,500 times. FIG. 20c shows the fibrillar polypropylene matrix interspersed with solid, amorphous cylinder of poly(ethylene glycol).

Figure 21A:
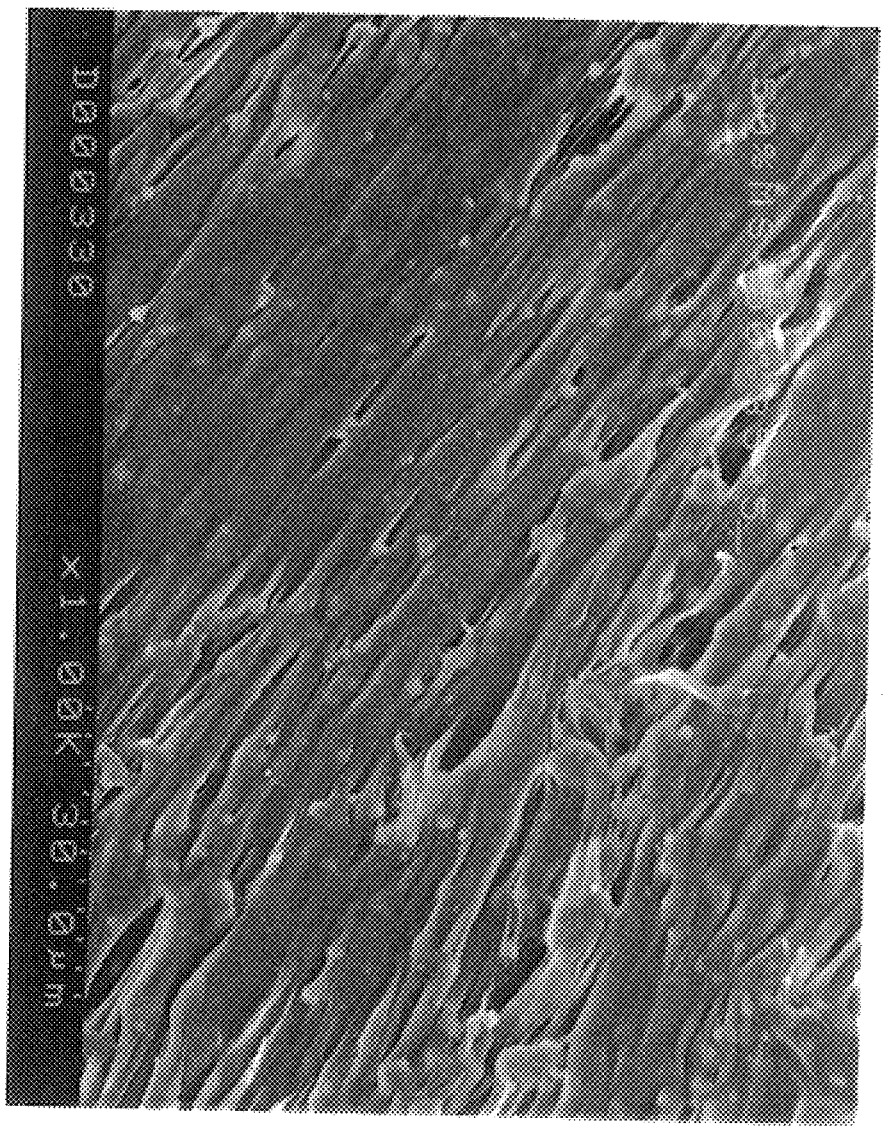
FIGS. 21a–c are scanning electron photomicrographs of a film sample of Film #6.
Figure 21B:
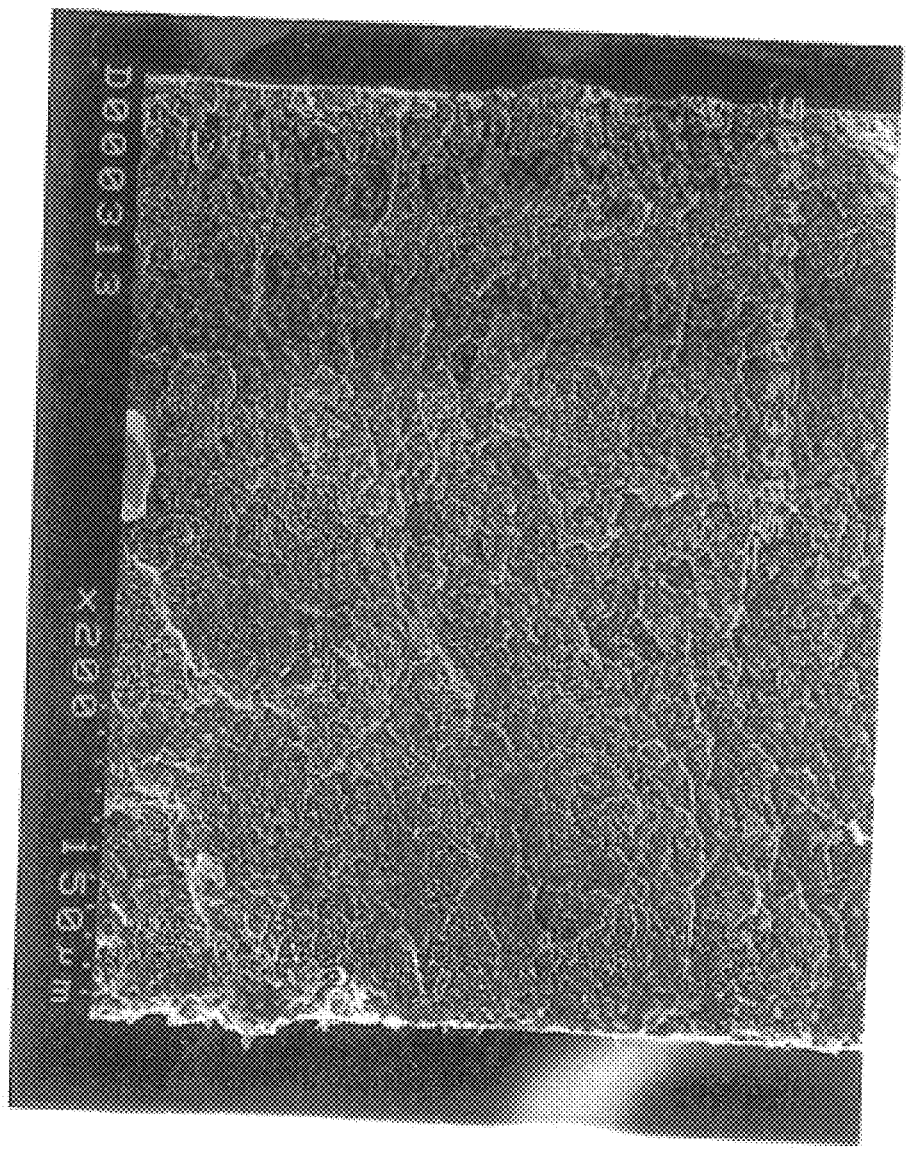
Figure 21C:
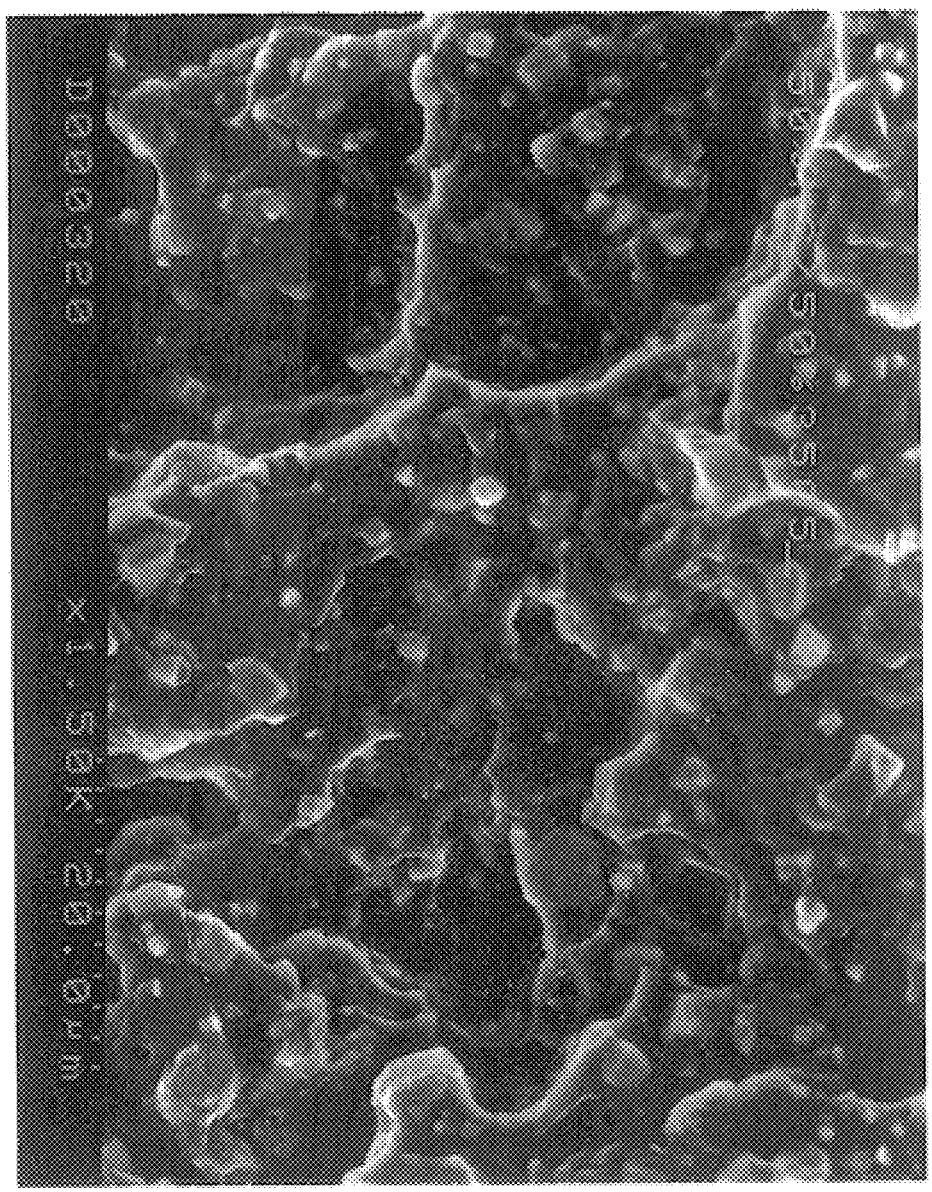

FIGS. 21a–c are scanning electron photomicrographs of film sample #6—about 50% polypropylene and 50% molecular sieve. FIGS. 21a–c illustrate a typically homogeneous dense matrix and discrete molecular sieves can only occasionally be seen and are deeply embedded in the polymer despite the high loading of molecular sieves. FIG. 21a shows the outer surface at a magnification of 1,000 times that is covered with long channels measuring 5–30 microns. The outline of the molecular sieves (1–10 microns) can be seen embedded beneath the surface of the polymer. The cross-sectional view is shown in FIG. 21b at a magnification of 200 times. FIG. 21b shows plate-like domains of polymer and a grainy appearance due to the high loading of molecular sieves. FIG. 21c is a cross-sectional view at a magnification 1,500 times and shows a dense morphology, substantially no porosity and many small particles embedded in the polymer.

Figure 22A:
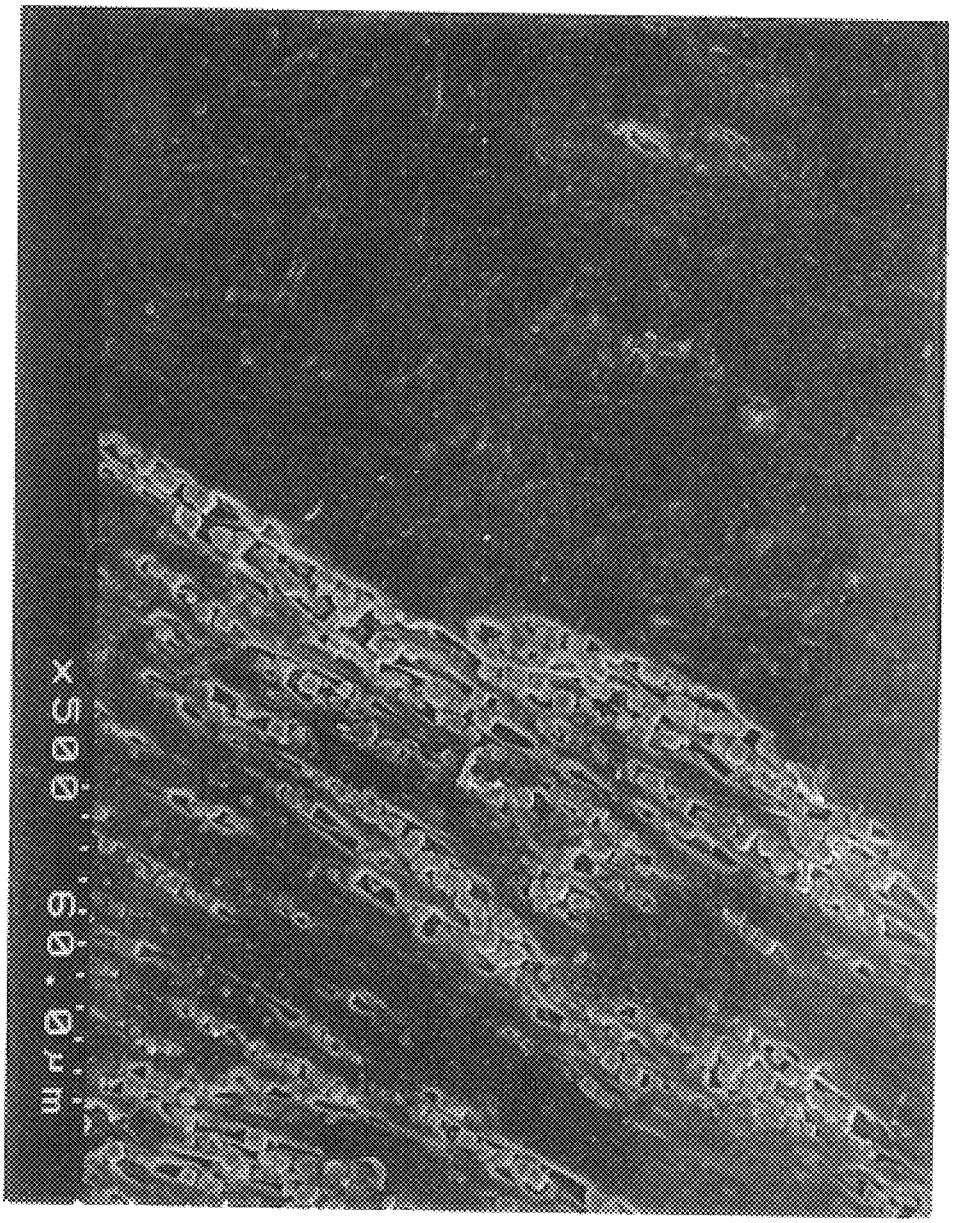
FIGS. 22a–d are scanning electron photomicrographs of a film sample of Film #3.
Figure 22B:
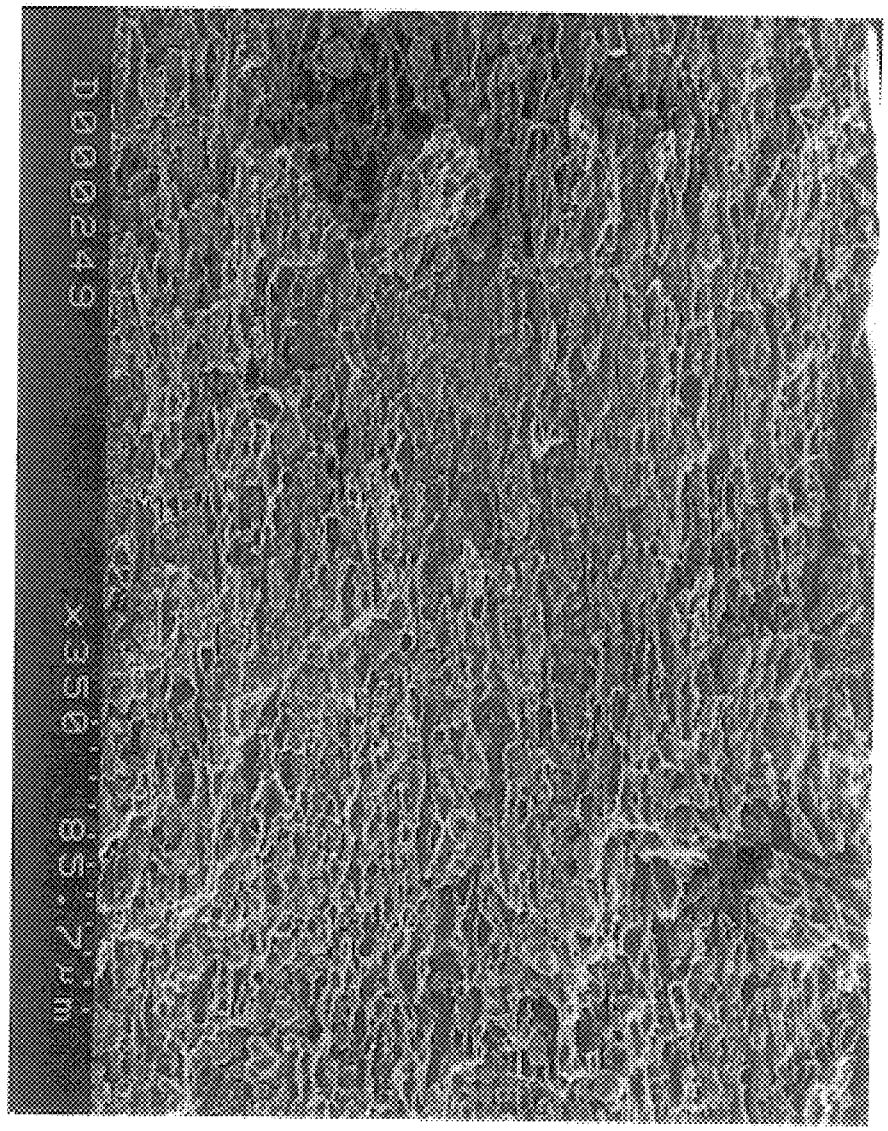
Figure 22C:
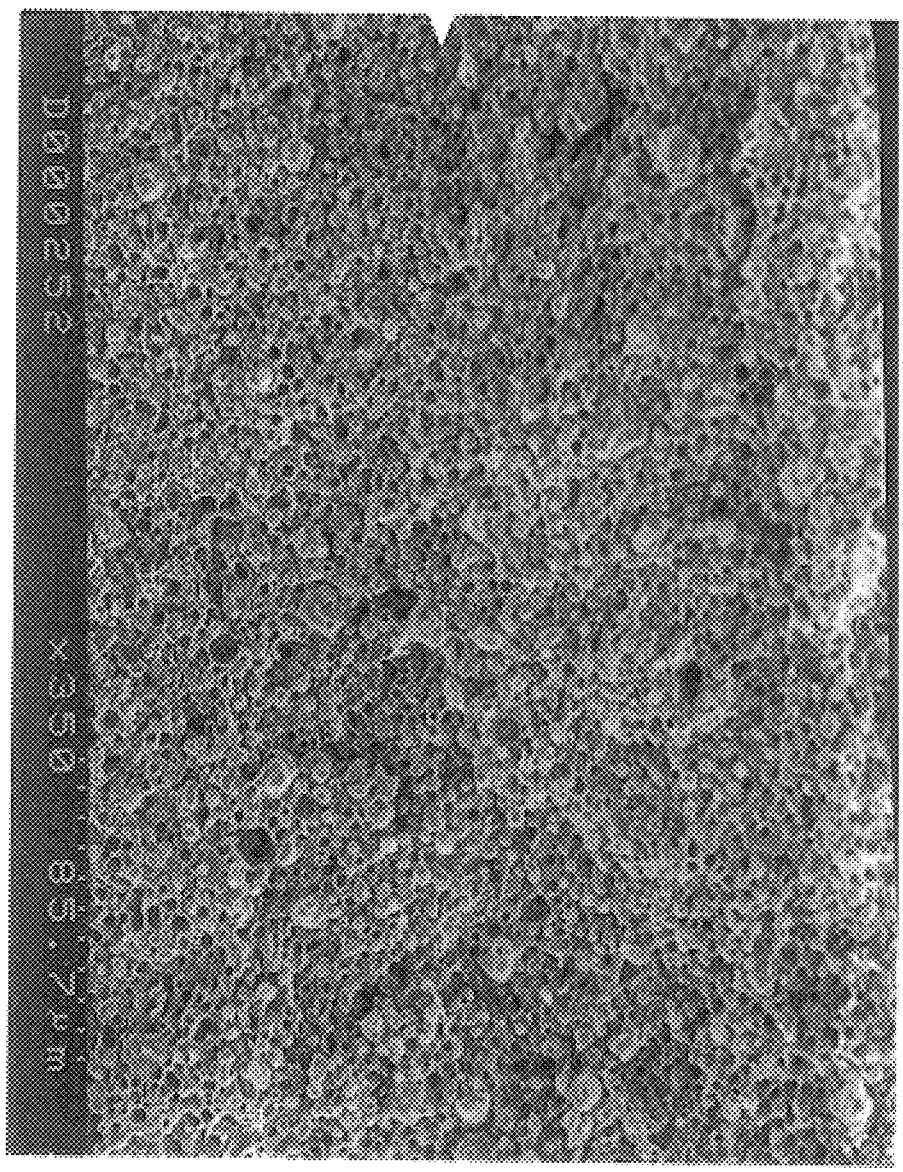
Figure 22D:
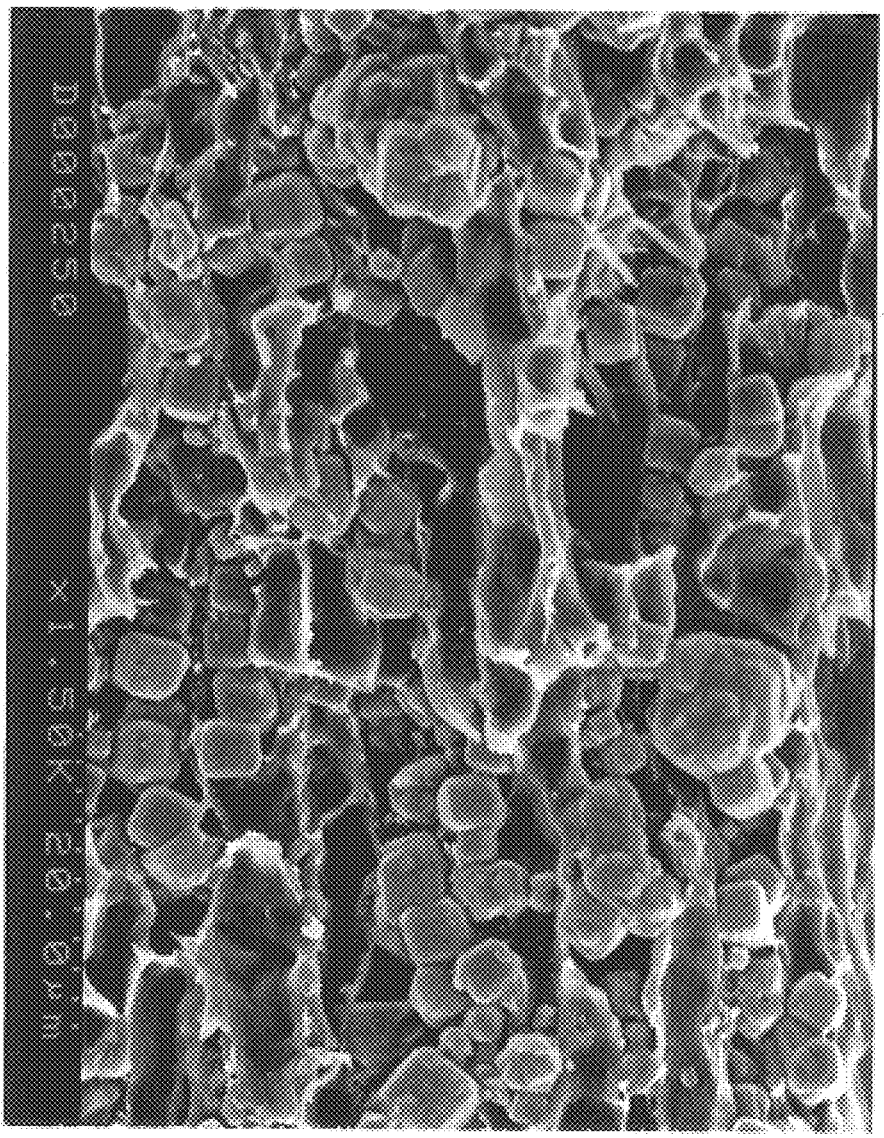

FIGS. 22a–d are scanning electron photomicrographs of film samples #3—about 52% molecular sieve, about 34% polypropylene and about 12% poly(ethylene glycol). FIGS. 22a–d show a three phase system with a highly porous morphology. FIG. 22a shows the outer surface at a magnification of 500 times that is covered with long channels, measuring 5–30 microns, and that is filled with numerous discrete molecular sieve particles. A cross-sectional view is shown in FIG. 22b at a magnification of 350 times. FIG. 22b shows a very porous morphology with long channels running in the fracture orientation. FIG. 22c is a cross-sectional view in the perpendicular orientation at a magnification of 350 times and appears to show holes. FIG. 22 is at higher magnifications—1,500 times. FIG. 22d shows channels containing discrete molecular sieves as well as agglomerates of many sieves embedded in the poly(ethylene glycol). Consequently, based on FIG. 22b, it is believed that the holes seen in FIGS. 22b and 22c are locations where the molecular sieve fell out during fracture preparation for SEM.

In conclusion, Examples 1, 2 and 3 further confirm the theory for the formation of interconnecting channels. Since, in one embodiment, the process begins at a temperature at which the hydrophilic agent is in molten form while the water-insoluble polymer is in solid form, it is believed that the third component (e.g. molecular sieve) is interacting with the liquid hydrophilic agent. Consequently, it is believed that, at this point, the interconnecting channels are formed because the hydrophilic agent flows easily and fills the gaps between the solid water-insoluble polymer and the molecular sieve components. As the process continues and the temperature increases, the water-insoluble polymer melts and thus, the composition becomes more uniform.

EXAMPLE 4

Figure 23A:
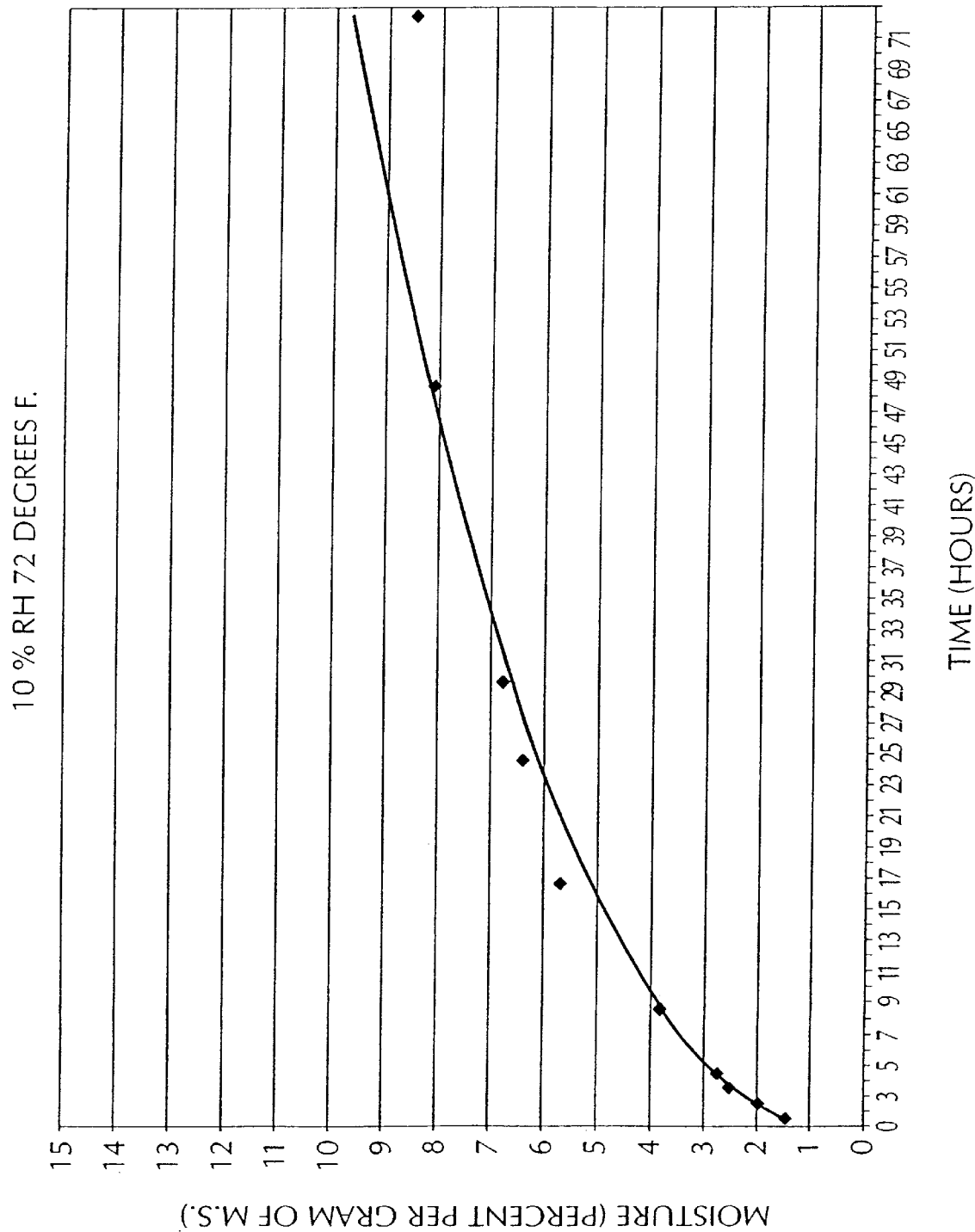
FIGS. 23a and 23b is a graphical view of showing the precent moisture gain per weight of molecular sieve at 10% Rh and 72° F. and 20% RH and 72° F., respectively.
Figure 23B:
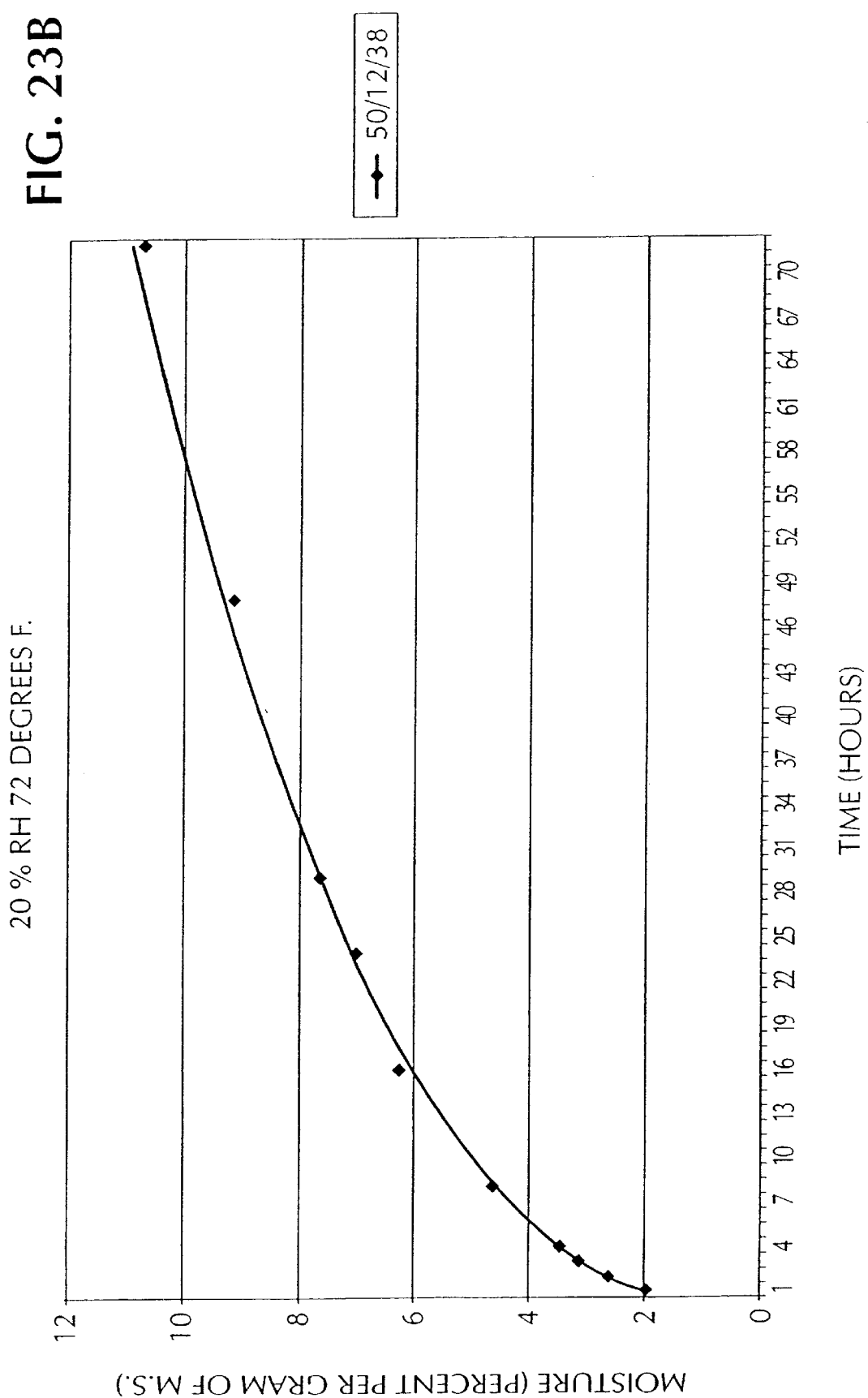

The purpose of the following example is to demonstrate the water absorption properties of the compositions of the present invention. Samples of film with similar processing conditions as film #1 were made having about 50% (w/w) of molecular sieve [4 Angstrom], about 12% (w/w) poly (ethylene glycol) and about 38% (w/w) polypropylene and were evaluated for moisture adsorption of its total weight by using the following test method (a) one environmental chamber was preset for 72° F. and 10% relative humidity ("Rh") and another chamber was preset for 72° F. and 20% Rh; (b) the dish was weighed and the weight recorded; (c) the scale was then tared to remove the weight of the dish from the balance; (d) the film was then added to the weighed dish; (e) the material was then weighed and the weight recorded; (f) the weigh dish with the sample was placed in the environmental chamber; (g) the sample was left in the chamber for the desired time; (h) after the desired time was reached, the dish with the sample was removed, re-weighed and the weight recorded; and (i) the precent moisture gained per gram of molecular sieve was calculated by (total weight gain of sample)/(weight of molecular sieve in sample)×100. The results are presented in FIGS. 23a [10% RH] and 23b [20% Rh] The maximum theorectical precent moisture gained per weight of a 4 Angstrom molecular sieve is about 24 to 25%. FIGS. 23a and 23b demonstrate that the high transmission rate (e.g., moisture absorption rate) of the present invention.

Monolithic compositions and their constituent compounds have been described herein. As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention.

What is claimed is:

1. An article of manufacture comprising a monolithic composition formed by combining at least the following components: a polymer having a solubility in water below about 0.1% at 25° C. and atmospheric pressure; a hydrophilic agent is at least about 10% by weight of the polymer and is selected from the group consisting of polyglycols poly(ethylene glycol), poly(propylene glycol), EVOH, pentaerithritol, PVOH, polyvinvlpyrollidine, vinylpyrollidone or poly(N-methyl pyrollidone), and saccharide based compounds, glucose, fructose and their alcohols, mannitol, dextrin, and hydrolized starch and mixtures thereof; and a releasing agent selected from the group consisting of pesticides, nematocides, fungicides and rodenticides;

wherein the composition comprises at least three phases and has interconnecting channels with the releasing agent in or adjacent to these channels.

2. The article of manufacture of claim 1 wherein the polymer is a thermoplastic.

3. The article of manufacture of claim 1, wherein the hydrophilic agent is a polyglycol.

4. An article of manufacture comprising a monolithic composition formed by combining at least the following components: a polymer having a solubility in water below about 0.1% at 25° C. and atmospheric pressure; a hydrophilic agent is at least about 10% by weight of the polymer and is selected from the group consisting of polyglycols, poly(ethylene glycol), poly(propylene glycol), EVOH, pentaerithritol PVOH, polyvinylpyrollidine, vinylpyrollidone or poly(N-methyl pyrollidone), and saccharide based compounds, glucose, fructose, and their alcohols, mannitol, dextrin, and hydrolized starch and mixtures thereof; and a releasing agent selected from the group consisting of fragrance, flavor and perfume sources;

wherein the composition comprises at least three phases and has interconnecting channels with the releasing agent in or adjacent to these channels.

5. The article of manufacture of claim 4 wherein the polymer is a thermoplastic.

6. The article of manufacture of claim 4 wherein the hydrophilic agent is a polyglycol.

7. An article of manufacture comprising a monolithic composition formed by combining at least the following components: a polymer having a solubility in water below about 0.1% at 25° C. and atmospheric pressure; a hydrophilic agent is at least about 10% by weight of the polymer and is selected from the group consisting of polyglycols, poly(ethylene glycol), poly(propylene glycol), EVOH, pentaerithritol, PVOH, polyvinylpyrollidine, vinylpyrollidone or poly(N-methyl pyrollidone), and saccharide based compounds, glucose, fructose, and their alcohols, mannitol, dextrin, and hydrolized starch and mixtures thereof; and a releasing agent selected from the group consisting of antimicrobial, corrosion inhibitors, ripening and antiripening agents;

wherein the composition comprises at least three phases and has interconnecting channels with the releasing agent in or adjacent to these channels.

8. The article of manufacture of claim 7 wherein the polymer is a thermoplastic.

9. The article of manufacture of claim 7 wherein the hydrophilic agent is a polyglycol.

10. An article of manufacture comprising a monolithic composition formed by combining at least the following components: a polymer having a solubility in water below about 0.1% at 25° C. and atmospheric pressure; a hydrophilic agent having a solubility in water above about 1% at 25° C. and atmospheric pressure and is at least about 10% by weight of the polymer; and a releasing agent selected from the group consisting of pesticides, nematocides, fungicides and rodenticides; wherein the composition comprises at least three phases and having interconnecting channels with the releasing agent in or adjacent to these channels.

11. The article of manufacture of claim 10 wherein the polymer is a thermoplastic.

12. The article of manufacture of claim 10 wherein the hydrophilic agent is a polyglycol.

13. An article of manufacture comprising a monolithic composition formed by combining at least the following components: a polymer having a solubility in water below about 0.1% at 25° C. and atmospheric pressure; a hydrophilic agent having a solubility in water above about 1% at 25° C. and atmospheric pressures and is at least about 10% by weight of the polymer; and a releasing agent selected from the group consisting of fragrance, flavor and perfume sources; wherein the composition comprises at least three phases and having interconnecting channels with the releasing agent in or adjacent to these channels.

14. The article of manufacture of claim 13 wherein the polymer is a thermoplastic.

15. The article of manufacture of claim 13 wherein the hydrophilic agent is a polyglycol.

16. An article of manufacture comprising a monolithic composition formed by combining at least the following components: a polymer having a solubility in water below about 0.1% at 25° C. and atmospheric pressure; a hydrophilic agent having a solubility in water above about 1% at 25° C. and atmospheric pressure and is at least about 10% by weight of the polymer; and a releasing agent selected from the group consisting of antimicrobial, corrosion inhibitors ripening and antiripening agents; wherein the composition comprises at least three phases and having interconnecting channels with the releasing agent in or adjacent to these channels.

17. The article of manufacture of claim 16 wherein the polymer is a thermoplastic.

18. The article of manufacture of claim 16 wherein the hydrophilic agent is a polyglycol.

19. An article of manufacture comprising a monolithic composition comprising at least the following components:
(a) a polymer having a solubility in water below about 0.1% at 25° C. and atmospheric pressure;
(b) a hydrophilic agent is at least about 10% by weight of the polymer and is selected from the group consisting of polyglycols, poly(ethylene glycol), poly(propylene glycol), EVOH, pentaerithritol, PVOH, polyvinylpyrollidine, vinylpyrollidone or poly(N-methyl pyrollidone), and saccharide based compounds, glucose, fructose, and their alcohols, mannitol, dextrin, and hydrolized starch and mixtures thereof; and
(c) a releasing agent selected from the group consisting of pesticides, nematocides, fungicides and rodenticides;
wherein the composition comprises at least three phases and has interconnecting channels with the releasing agent in or adjacent to these channels.

20. The article of manufacture of claim 19 wherein the polymer is a thermoplastic.

21. The article of manufacture of claim 19 wherein the hydrophilic agent is a polyglycol.

22. An article of manufacture comprising a monolithic composition comprising at least the following components:
(a) a polymer having a solubility in water below about 0.1% at 25° C. and atmospheric pressure;
(b) a hydrophilic agent is at least about 10% by weight of the polymer and is selected from the group consisting of polyglycols, poly(ethylene glycol), poly(propylene glycol), EVOH, pentaerithritol, PVOH, polyvinylpyrollidine, vinylpyrollidone or poly(N-methyl pyrollidone), and saccharide based compounds glucose, fructose, and their alcohols, mannitol, dextrin, and hydrolized starch and mixtures thereof; and
(c) a releasing agent selected from the group consisting of fragrance, flavor and perfume sources;
wherein the composition comprises at least three phases and has interconnecting channels with the releasing agent in or adjacent to these channels.

23. The article of manufacture of claim 22 wherein the polymer is a thermoplastic.

24. The article of manufacture of claim 22 wherein the hydrophilic agent is a polyglycol.

25. An article of manufacture comprising a monolithic composition comprising at least the following components:
(a) a polymer having a solubility in water below about 0.1% at 25° C. and atmospheric pressure;
(b) a hydrophilic agent is at least about 10% by weight of the polymer and is selected from the group consisting of polyglycols, poly(ethylene glycol), poly(propylene glycol), EVOH, pentaerithritol, PVOH, polyvinylpyrollidine, vinylpyrollidone or poly(N-methyl pyrollidone), and saccharide based compounds, glucose, fructose, and their alcohols, mannitol, dextrin, and hydrolized starch and mixtures thereof; and
(c) a releasing agent selected from the group consisting of antimicrobial, corrosion inhibitors, ripening and anti-ripening agents;
wherein the composition comprises at least three phases and has interconnecting channels with the releasing agent in or adjacent to these channels.

26. The article of manufacture of claim 25 wherein the polymer is a thermoplastic.

27. The article of manufacture of claim 25 wherein the hydrophilic agent is a polyglycol.

28. An article of manufacture comprising a monolithic composition comprising at least the following components:
(a) a polymer having a solubility in water below about 0.1% at 25° C. and atmospheric pressure;
(b) a hydrophilic agent having a solubility in water above about 1% at 25° C. and atmospheric pressure and is at least about 10% by weight of the polymer; and
(c) a releasing agent selected from the group consisting of pesticides, nematocides, fungicides and rodenticides;
wherein the composition comprises at least three phases and having interconnecting channels with the releasing agent in or adjacent to these channels.

29. The article of manufacture of claim 28 wherein the polymer is a thermoplastic.

30. The article of manufacture of claim 28 wherein the hydrophilic agent is a polyglycol.

31. An article of manufacture comprising a monolithic composition comprising at least the following components:
   (a) a polymer having a solubility in water below about 0.1% at 25° C. and atmospheric pressure;
   (b) a hydrophilic agent having a solubility in water above about 1% at 25° C. and atmospheric pressure and is at least about 10% by weight of the polymer; and
   (c) a releasing agent selected from the group consisting of fragrance, flavor and perfume sources;
wherein the composition comprises at least three phases and having interconnecting channels with the releasing agent in or adjacent to these channels.

32. The article of manufacture of claim 31 wherein the polymer is a thermoplastic.

33. The article of manufacture of claim 31 wherein the hydrophilic agent is a polyglycol.

34. An article of manufacture comprising a monolithic composition comprising at least the following components:
   (a) a polymer having a solubility in water below about 0.1% at 25° C. and atmospheric pressure;
   (b) a hydrophilic agent having a solubility in water above about 1% at 25° C. and atmospheric pressure and is at least about 10% by weight of the polymer; and
   (c) a releasing agent selected from the group consisting of antimicrobial, corrosion inhibitors ripening and anti-ripening agents;
wherein the composition comprises at least three phases and having interconnecting channels with the releasing agent in or adjacent to these channels.

35. The article of manufacture of claim 34 wherein the polymer is a thermoplastic.

36. The article of manufacture of claim 34 wherein the hydrophilic agent is a polyglycol.

* * * * *